(12) United States Patent
Bryson

(10) Patent No.: US 7,346,025 B2
(45) Date of Patent: Mar. 18, 2008

(54) PORTABLE WIRELESS GATEWAY

(75) Inventor: Sidney Llewellyn Bryson, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1009 days.

(21) Appl. No.: 10/377,195

(22) Filed: Feb. 28, 2003

(65) Prior Publication Data

US 2004/0185777 A1 Sep. 23, 2004

(51) Int. Cl.
*H04Q 7/00* (2006.01)
(52) U.S. Cl. ................................ 370/328; 370/401
(58) Field of Classification Search ............... 370/401, 370/402, 310.2, 313, 328, 331, 332, 338, 370/465, 341, 349, 249, 395.5, 466, 467
See application file for complete search history.

(56) References Cited

U.S. PATENT DOCUMENTS

| | | | |
|---|---|---|---|
| 5,613,198 A | 3/1997 | Ahmadi et al. | |
| 5,790,548 A * | 8/1998 | Sistanizadeh et al. | 370/401 |
| 6,032,057 A | 2/2000 | Kiiski | |
| 6,055,564 A * | 4/2000 | Phaal | 709/207 |
| 6,144,852 A | 11/2000 | Orosz | |
| 6,353,853 B1 * | 3/2002 | Gravlin | 709/219 |
| 6,631,416 B2 * | 10/2003 | Bendinelli et al. | 709/227 |
| 6,904,029 B2 * | 6/2005 | Fors et al. | 370/331 |
| 6,934,751 B2 * | 8/2005 | Jayapalan et al. | 709/224 |
| 6,973,057 B1 * | 12/2005 | Forslow | 370/328 |
| 6,999,449 B2 * | 2/2006 | Barna et al. | 370/352 |
| 7,194,554 B1 * | 3/2007 | Short et al. | 709/246 |
| 2001/0055283 A1 | 12/2001 | Beach | |
| 2002/0028655 A1 | 3/2002 | Rosener et al. | |
| 2002/0051432 A1 * | 5/2002 | Shin | 370/331 |
| 2002/0138625 A1 | 9/2002 | Bruner et al | |
| 2002/0142717 A1 | 10/2002 | Morimoto | |
| 2002/0152468 A1 | 10/2002 | Parkman | |
| 2002/0159399 A1 | 10/2002 | Stephenson | |
| 2002/0160773 A1 | 10/2002 | Gresham et al. | |
| 2002/0164960 A1 | 11/2002 | Slaughter et al. | |
| 2002/0167917 A1 | 11/2002 | Stephenson et al. | |
| 2002/0168975 A1 | 11/2002 | Gersham et al. | |
| 2002/0170060 A1 | 11/2002 | Lyman | |
| 2002/0172174 A1 | 11/2002 | Dick et al. | |
| 2002/0173305 A1 | 11/2002 | Forman et al. | |
| 2003/0008611 A1 | 1/2003 | Forman et al. | |
| 2003/0009761 A1 | 1/2003 | Miller et al. | |
| 2004/0052212 A1 * | 3/2004 | Baillargeon | 370/235 |
| 2004/0085944 A1 * | 5/2004 | Boehm | 370/338 |

OTHER PUBLICATIONS

6WINIT IPv6 Wireless Internet IniTiative, IST-2000-25153, Deliverable D1: "Specification and Architecture of the Network Available IPv6 Communications, Gateways and Components," Aug. 16, 2001.
6WINIT IPv6 Wireless Internet IniTiative, IST-2000-25153, Deliverable D8: "Description of Basic Network Components," Feb. 5, 2002.

* cited by examiner

Primary Examiner—Brenda Pham

(57) ABSTRACT

A portable wireless network gateway aggregates bandwidth demand of different devices operating under different communications protocols. Network connectivity is provided by encapsulating data from the different devices to make the data appear to be data native to a single network. For example, the single network is a cellular wireless network. The different communications protocols include but are not limited to IEEE 802.11, IEEE 802.3, USB, cellular wireless protocols, Bluetooth, RS-232, and IEEE 11.1R.

37 Claims, 14 Drawing Sheets

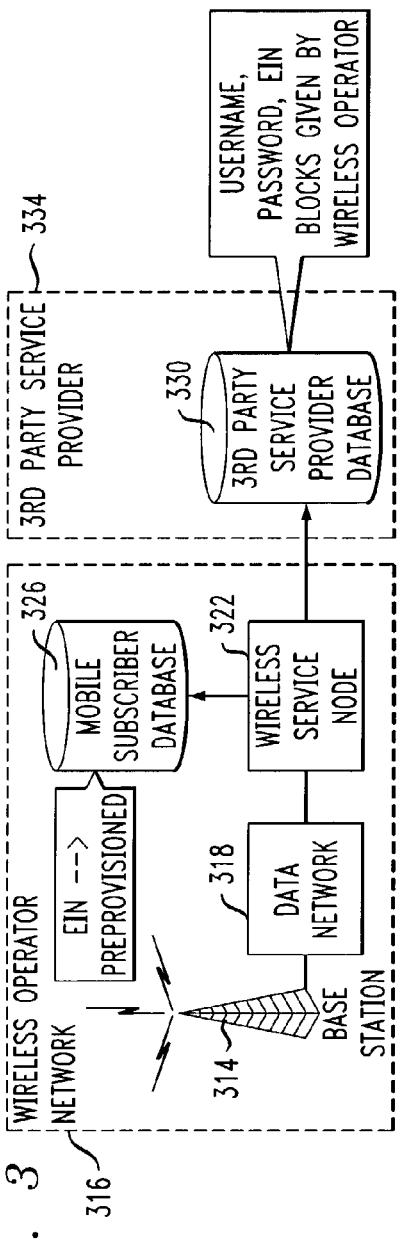
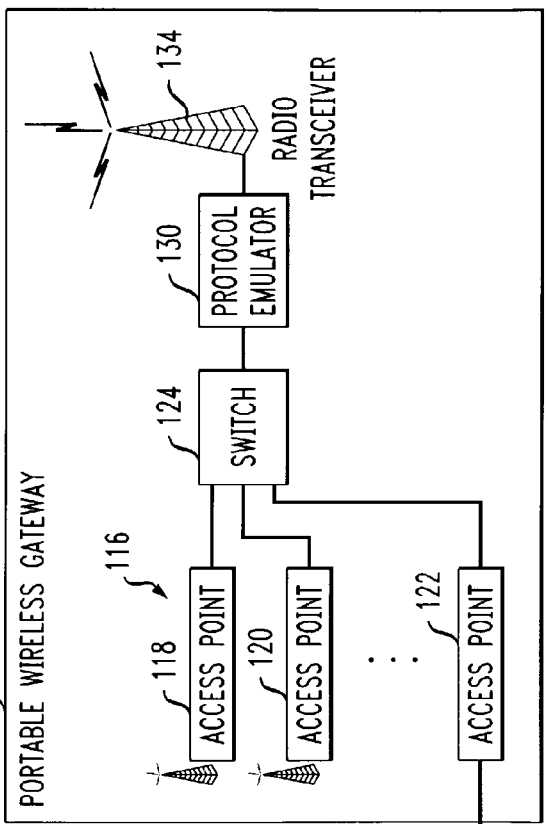
FIG. 3
FIG. 1

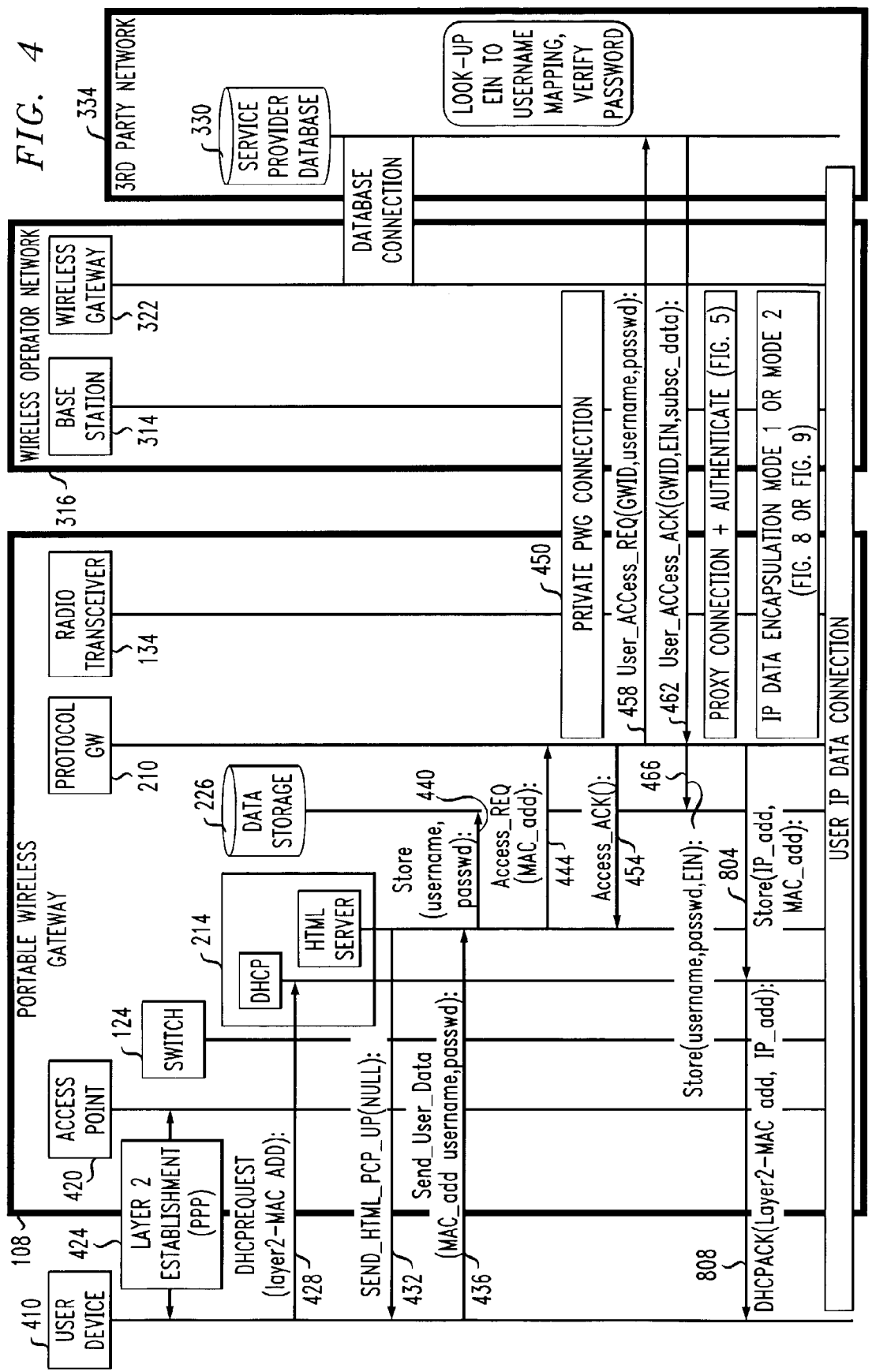

PORTABLE WIRELESS GATEWAY

BACKGROUND

The invention is directed toward systems and methods for improving and extending wireless communications networks. The invention will be described in terms of 2G and 3G cellular communications networks. However, the invention can be readily adapted to be implemented in other communications environments. Additionally, the invention can be used to extend and improve communications for wired devices.

Many electronic devices are equipped to communicate with other electronic devices and networks. For example, cell phones, laptop computers, personal digital assistants (PDA) and pagers include means, such as, for example, IEEE 802.11 Wireless Ethernet, IEEE 802.3 Ethernet, HiperLan, Universal Serial Bus (USB), RS-232 serial ports, Bluetooth, wired telephone modems, cellular wireless, and IEEE 11.1R communications ports for connecting the devices to other devices and networks.

These communications ports are all based on standards and technologies known in the computer and/or communications arts. For example, IEEE 802.11 refers to a family of specifications developed by the Institute of Electrical and Electronics Engineers for wireless Local Area Network technology. IEEE 802.11 specifies an over-the-air interface between a wireless client and a base station or between two wireless clients. There are several specifications in the 802.11 family. 802.11 applies to wireless LANs and provides 1 or 2 Mbps transmission in the 2.4 GHz RF band using either frequency hopping spread spectrum (FHSS) or direct sequence spread spectrum (DSSS). IEEE 802.11a is an extension to 802.11 that applies to wireless LANs and provides up to 54 Mbps in the 5 GHz band. 802.11a uses an orthogonal frequency division multiplexing encoding scheme rather than FHSS or DSSS. IEEE 802.11b (also referred to as 802.11 High Rate or Wi-Fi) is an extension to 802.11 that applies to wireless LANS and provides 11 Mbps transmission (with a fallback to 5.5, 2 and 1 Mbps) in the 2.4 GHz band. 802.11b uses only DSSS. 802.11b was a 1999 ratification to the original 802.11 standard, allowing wireless functionality comparable to Ethernet. IEEE 802.11g. applies to wireless LANs and provides 20+ Mbps in the 2.4 GHz band.

The High Performance Radio Local Area Network (HiperLAN), was developed by the European Telecommunications Standards Institute, and is a set of WLAN communication standards used chiefly in Europe. HiperLAN is similar to the IEEE 802.11 WLAN standards used in the U.S. There are two types of HiperLAN: HiperLAN/1: provides communications at up to 20 Mbps in the 5 GHz band. HiperLAN/2: provides communications at up to 54 Mbps in the 5 GHz band. Like 802.11, HiperLAN serves to ensure the possible interoperability of different manufacturers' wireless communications equipment that operate in this spectrum.

Bluetooth refers to a short-range radio technology aimed at simplifying communications among Net devices and between devices and the Internet. It also aims to simplify data synchronization between Net devices and other computers. Products with Bluetooth technology must be qualified and pass interoperability testing by the Bluetooth Special Interest Group prior to release. The Bluetooth 1.0 specification consists of two documents: the Foundation Core, which provides design specifications, and the Foundation Profile, which provides interoperability guidelines. Bluetooth's founding members include Ericsson, IBM, Intel, Nokia and Toshiba. These provisions for connectivity can greatly enhance the usefulness of these devices.

These connectivity provisions, and others can allow for the exchange of e-mail or simple messages, and the accessing of proprietary or public information. For example, a salesman may use one of these devices to access company pricing and inventory information. A tourist may use the devices to access entertainment listings or restaurant information publicly available over the Internet. The timely access of information afforded by this mobile device connectivity can greatly enhance the efficiency of device users. For example, the rapid delivery of information can help close a business deal and/or enhance the quality of decisions.

However, in order to communicate with another device, a user's device must be within range of, or be able to connect to, the other device or an access point associated with the other device. Unfortunately, such access points are not universally available. Access points can only be profitably provided where the costs of such access points can be distributed over a sufficiently large number of users or over a sufficiently large volume of access point traffic.

The wide variety of connectivity protocols further aggravates the problem of access point justification. In many locations, where the total connectivity bandwidth desired might justify the installation of an access point, the access point cannot be profitably provided because the band width demand is distributed over a large number of different connectivity protocols. For example, 50 percent of the bandwidth demand at a given location might be cellular telephone traffic. Twenty-two percent might be IEEE 802.11 wireless Ethernet traffic, 20 percent might be USB traffic and 9 percent might be based on the Bluetooth protocol. At this exemplary location, the traffic demand of any single connectivity technology may be insufficient to justify the establishment of an access point.

The present invention solves this problem by aggregating the connectivity demands of a plurality of users associated with a plurality of user devices wherein the devices can be adapted to communicate via different communications protocols. Additionally, the present invention extends the range of the user devices by retransmitting data from the devices with an increased effective radiated power. For example, a transmitting antennae associated with the invention is spaced from the user's thereby reducing the user exposure to radiated energy and alleviating concerns of regulatory agencies.

SUMMARY

A portable wireless gateway includes at least one access point operative to communicate with user devices, a transceiver operative to communicate with a network; and a protocol emulator. The protocol emulator is, for example, operative to encapsulate user device data relayed by the at least one access point to prepare the user device data for transmission by the transceiver. The preparation includes making the data compatible with a protocol associated with a network with which the transceiver communicates. The protocol emulator is also operative to unpackage data from the network relayed by the transceiver for delivery to the at least access point and relaying to at least one of the user devices.

The transceiver can include a radio transceiver operative to communicate with a public mobile data network, a wireless telephone based broadband communications link, a UMTS based transceiver, a CDMA 2000 based transceiver, a fixed wireless based communications link or any other wired or wireless transceiver.

The at least one access point can include, for example, an IEEE 802.11 access point a Bluetooth access point, UMTS Node B access point, a HiperLan access point, an IEEE 802.3 access point, a Universal Serial Bus access point, RS-232 serial ports, access point, cellular wireless access point, IEEE 11.1R access point or an access point for any other user device networking or interconnecting protocol that is available or might become available.

The protocol emulator can be operative to control and coordinate radio frequencies used by the at least one access point. The protocol emulator can include a queuing device. The queuing device can be operative to queue traffic based on quality of service parameters associated with the traffic. The queuing device can be operative to prevent denial of service to user devices associated with a high quality of service. The protocol emulator can also include an administration and maintenance module operative to perform billing and security functions in communication with the protocol gateway.

The administration and maintenance module can include a dynamic host configuration protocol server. Additionally, or alternatively, the administration and maintenance module can include an HTML server operative to supply log on screens for delivery to user devices and to receive and process log on information.

The protocol gateway can be operative to encapsulate data so as to act as a proxy for the user devices.

The at least one access point and the protocol gateway can be operative to negotiate a user device handover to or from another portable wireless gateway device when a comparison of a first signal strength between the user device and the at least one access point and a second signal strength between the user device and an access point of the other portable wireless gateway indicates that a handover is warranted.

In some embodiments the transceiver is further operative to act as an access point for a cellular wireless device and the protocol gateway and the transceiver are operative to relay traffic between the cellular wireless device and a base station of a cellular wireless network.

In some embodiments the protocol gateway and the transceiver cooperate to securely send Internet protocol data via encrypted tunnels of a virtual private network.

One embodiment is an apparatus for aggregating bandwidth demand. The apparatus includes a plurality of respective access points each respective access point of the plurality being operative to communicate with respective user devices using a respective communications protocol of the respective user devices, a main radio transceiver operative to communicate with a wireless network, and a protocol emulator operative to package data received by the plurality of access points from the respective user devices for transmission by the main radio transceiver to the wireless network, and unpackage data from the main radio transceiver for delivery to the respective user devices through the respective access points.

The protocol emulator can be operative to package data from the respective user devices as digital cellular data, and unpackage digital cellular data from the radio transceiver for consumption by the respective user devices. For example, the protocol emulator can be operative to emulate at least one digital cellular device to facilitate delivery of user device data to and from a remote digital cellular network base station.

Furthermore, emulator can be operative to set up tunnels for transporting data between the protocol emulator and a wireless service node of the wireless network.

The main radio transceiver can include an access point operative to communicate with an access point of a wireless local area network.

Another embodiment is a method for providing network connectivity for a plurality of respective user devices. The method includes communicating with each of the respective user devices using respective communications protocols of each respective device, packaging data from each respective device to make the data appear to be cellular network data, transmitting the packaged data as cellular telephone data, thereby providing network connectivity. For example, the method can include acting as a proxy for the respective user devices.

The method can further include receiving encapsulated data encapsulated as cellular telephone data, unpackaging the received cellular telephone data, and, delivering the unpackaged data to the respective user devices as indicated by the unpackaged data.

The method can also include establishing a communications tunnel to a service node and wherein the transmitting comprises transmitting the packaged data via the communications tunnel.

BRIEF DESCRIPTION OF THE DRAWINGS

The invention may take form in various components and arrangements of components, and in various procedures and arrangements of procedures. The drawings are only for purposes of illustrating preferred embodiments and are not to be construed as limiting the invention. Further, it is to be appreciated that the drawings are not to scale.

FIG. 1 is block diagram of a portable wireless gateway.,

FIG. 3 is block diagram of part of a network of a wireless operator interconnected with part of a network of a third party service provider.

FIG. 4 is call flow diagram illustrating a first part of an authorization procedure.

DETAILED DESCRIPTION OF PREFERRED EMBODIMENTS

Figure 2:
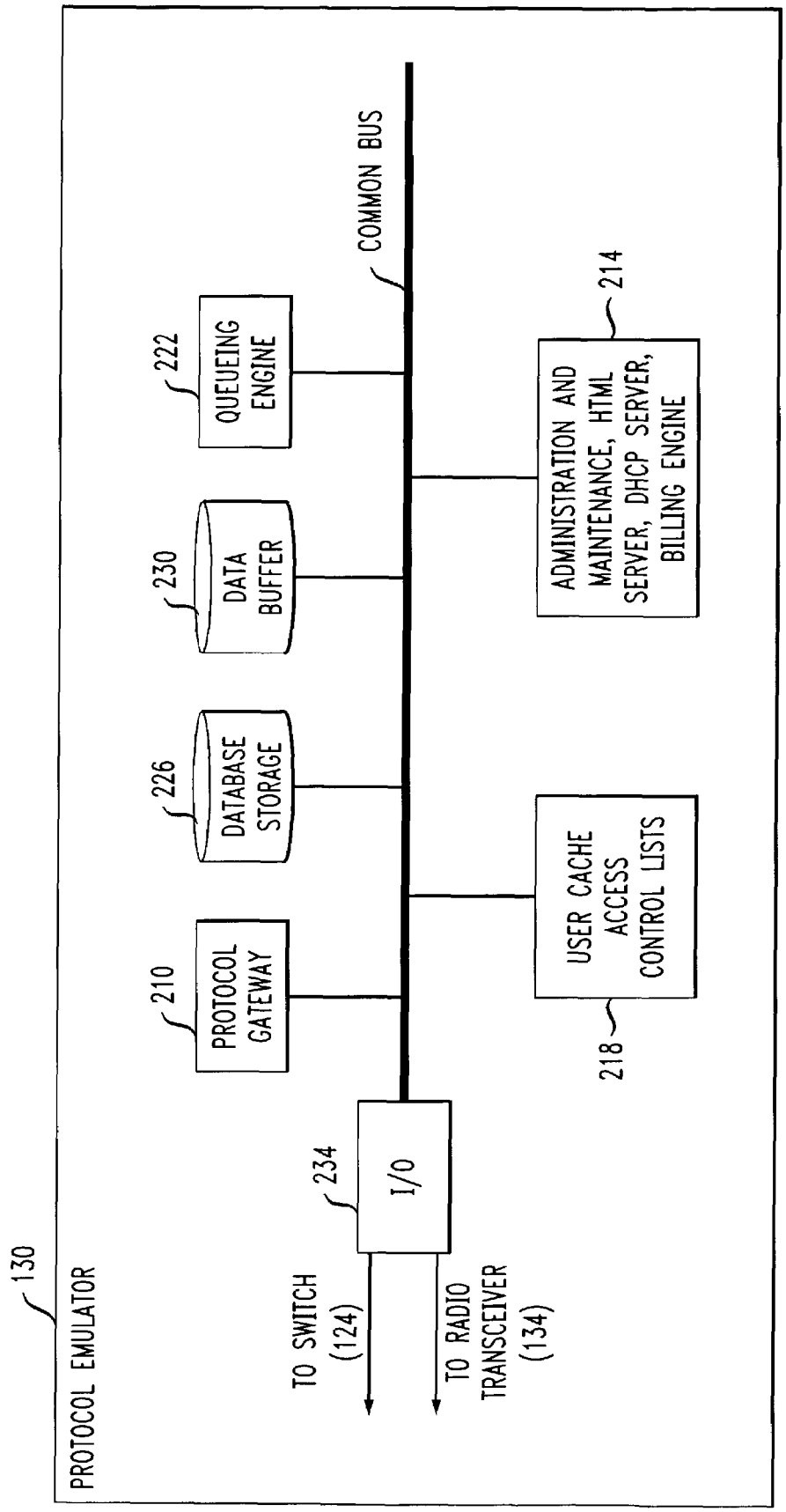
FIG. 2 is a block diagram of one of the elements of the portable wireless gateway of FIG. 1.

Referring to FIG. 1, a portable wireless gateway 108 is operative to aggregate bandwidth demand of a plurality 112 of user devices. The devices of the plurality 112 may communicate with different communications protocols. For example, some of the user devices may communicate via IEEE 802.11 wireless Ethernet, IEEE 802.3 Ethernet, IEEE 1394, Bluetooth, HiperLAN, cellular wireless, such as, Universal Mobile Telephone Service (UMTS), General Packet Radio Services (GPRS), and Global System for Mobile Communications (GSM), 11.1R infrared communications, Universal Serial Bus (USB) and RS-232 Serial communications.

In order to aggregate the bandwidth demand of differently enabled devices, the portable wireless gateway (PWG) 108 includes a plurality 116 of access points. The plurality 116 of access points may support one or more of the protocols listed above or others. For example, the plurality 116 may include an IEEE 802.11 wireless Ethernet access point 118, a Bluetooth access point 120, a wired Ethernet access point 122, as well as access points for other technologies. Each of the plurality 116 of access points may be connected to a switch 124. For example, the plurality 116 of access points (AP) are wired via Ethernet or some other Layer 2 (referring to the OSI model) transport means to an Ethernet (or other Layer 2) switch. The switch 124 in turn is connected to a protocol emulator 130. The protocol emulator 130 also communicates with a main radio transceiver 134. Connections between the protocol emulator 130, the switch 124 and transceiver 134 may be also made via a Layer 2 transport means such as Ethernet.

While the access points 118, 120, 122 may be based on different protocols; they share some characteristics in common. Each access point (AP) 118, 120, 122 of the plurality 116 is responsible for negotiating initial access of related ones of the plurality 112 of the user devices. For example, the access points may include Dynamic Host Configuration Protocol servers or relays. Alternatively, the DHCP servers or relays may be associated with the protocol emulator 130. Access points can be implemented as a combination of hardware and software. They provide the complete functionality of current state-of-the-art wireless access points; or Layer 2 switches, in the case where they provide wired connectivity to user devices (e.g., wired Ethernet).

Preferably, the access points support peer-to-peer connectivity between access points of the same type. As will be explained in greater detail below, it is preferable that access points support a protocol and direct routing method to transfer data, about mobility of its clients (user devices), and peer access points in other devices, to the protocol emulator 130.

The communication link and protocol between the access points 116 and the protocol emulator 130 (and/or switch 124) are preferably the same for all access points. This facilitates access point modularity, allowing different combinations of access points to be installed within a protocol gateway 108.

Access points are associated with a control link from the protocol emulator and are slaved to the protocol emulator via that link. For example, the protocol emulator 130 uses the control link to control which channels a particular access point uses in the public radio frequency spectrum. Since the protocol emulator 130 is in control of the radio frequencies used by the access points, the protocol emulator 130 can coordinate frequency usage. Therefore, a plurality of devices can operate simultaneously even though they are all designed to work with the same frequency band (e.g., 2.4 GHz). For instance, the first wireless access point 118 network may operate on a 2.4 GHz channel 3 while the second wireless access point 120 operates on 2.4 GHz channel 5 and a third access point network operates on 2.4 GHz channel 9. The communications link also facilitates protocol emulator 130 management of access to the portable wireless gateway (PWG) 108. For example, the control link allows the protocol emulator to instruct the access points 116 to block certain user devices from a network. For example, where a user device is not associated with a user account, data from the user device can be blocked at the access point as directed by the protocol emulator.

In some embodiments, the access points implement Layer 3 (referring to the OSI model) routing protocols. This feature facilitates multi-processor protocol emulator 130 designs. In these embodiments, the communication link between the access points and the protocol emulator includes processor routing information.

As will be explained in greater detail below, in some cases, one or more access point is used as the primary radio transceiver. In those cases, the access point supports the main radio transceiver functionality. In these embodiments, the access points might not be controlled as described above but are controlled to connect to a broadband access system.

The switch 124 interconnects or routes information to and from the plurality 116 of access points (e.g., 118, 120, 122) to the protocol emulator 130. The switch 124 may be a Layer 2 device. In some embodiments, the switch provides full duplex 100 Mbps interconnects. In some embodiments, the switch 124 is an Ethernet switch. However, other protocols and other throughputs may be selected.

The switch 124 may be implemented as a switching fabric. For example, the PWG 108 may include a modular design wherein the access points 116, protocol emulator 130 and transceiver 134 plug into a common back plane. For example, the back plane may comprise a 1000 Gbps, full duplex point-to-point fabric controlled by a switch card.

While the wired Ethernet 122 access point is depicted in FIG. 1 as a separate module, wired access may be made more directly to the switch 124. For example, the switch 124 may include telecommunication connectors such as, RJ-45, optical, or other telecommunications connectors. In such embodiments, either the switch 124 or the protocol emulator must provide the functionality provided by the other access points (e.g., 118, 120). For example, either the switch 124 or the protocol emulator 130 must provide for initial connection of user devices. In the illustrated embodiment, the switch 124 is shown logically connected between the access points 116 and the protocol emulator 130. The radio transceiver 134 is shown connected directly to the protocol emulator. However, the main radio transceiver 134 may be physically connected to the protocol emulator 134 through the switch 124 or may be connected as illustrated in a point-to-point fashion to the protocol emulator 130 with communications between the protocol emulator 130 and the main radio transceiver 134 being controlled through a common backplane. In most embodiments, the switch is implemented in hardware with limited amounts of firmware.

The protocol emulator 130 packages data received from the plurality 112 of user devices (through the access points 116) for transport over currently available wireless networks and prepares data received from the main radio transceiver 134 for delivery to the appropriate ones of the plurality 112 of user devices (via the access points 116). In so doing, the protocol emulator 130 performs a wide range of functions. For purposes of explanation, the functions of the protocol emulator have been divided into functional blocks as illustrated in FIG. 2. However, the protocol emulator 130 can be explained or embodied in terms of other configurations or other functional blocks without departing from the spirit and scope of this disclosure.

Referring to FIG. 2, the protocol emulator 130 can be explained in terms of a protocol gateway 210, an administration and maintenance module 214, a user cache 218, a queuing engine 222, a data storage device 226, a data buffer 230, and input/output (I/O) 234.

The protocol gateway 210 is an emulation engine. Emulation is facilitated through the services of an encapsulation engine and a de-encapsulation engine working in concert with a broadband interface module and a plurality of access point interface modules. The broadband interface module provides protocol information specific to one or more wireless networking systems with which the PWG 108 is intended to communicate. The plurality of access point interfaces provide similar information in regard to the access technologies of the supported plurality 112 of user devices.

The protocol gateway 210 may also include a user cache interface, a queuing engine interface, an administration and maintenance module interface, and a data storage interface. These interfaces provide for communications between the protocol gateway 210 and the user cache 218, administration and maintenance module 214, queuing engine 222 and the database storage device 226. The protocol gateway includes one or more state machines for keeping track of the states of the plurality 112 of user devices and for associating the states of the various access technologies to related states of the broadband access network being used to provide network connectivity to the PWG 108 and the associated user devices 112. The access point interfaces maintain information regarding routing of data to the access points and thereby to the proper ones of the plurality 112 of user devices. In most embodiments, the protocol gateway is implemented substantially in software.

The user cache interface allows the protocol gateway 210 to store and retrieve user information that is required to route and filter data to and from the user devices 112. For example, the user cache interface allows the protocol gateway 210 to store and retrieve user subscription information and access lists. User subscription information may include, for example, bandwidth and quality of service limitations associated with a particular user or user device. Access lists may indicate whether or not a user or user device has permission to use the portable wireless gateway 108 or networks associated therewith.

The queuing engine interface passes encapsulated data provided by the encapsulation engine to the data buffer 230 associated with the queuing engine 222. The encapsulation engine encapsulates user data as a payload by, for example, associating the user data with a tunneling protocol header as directed by the broadband interface module.

The de-encapsulation engine receives encapsulated data from, for example, the main radio transceiver 134. As will be explained in greater detail below, the de-encapsulation engine removes transport layer encapsulation or header information from the data it receives. For example, some received data may include a radio link control header and/or tunnel headers associated with wireless transport and/or broadband networks associated with the wireless link in communication with the main transceiver 134. The de-encapsulation engine removes these headers and allows the protocol gateway to direct the payload to the appropriate access point (e.g., 118, 120, 122) associated with the appropriate one of the plurality 112 of user devices. As will also be explained in greater detail below, some data received by the portable wireless gateway 108 may not require encapsulation or de-encapsulation. When this occurs, the protocol gateway may send the data directly to the queuing engine without encapsulating it, modifying it or reading the payload. For example, this could occur when data is received already in a format compatible with the broadband network associated with the portable wireless gateway 108.

When data is received from one of the user devices or broadband network, the encapsulation or de-encapsulation engine reads, for example, an IP header associated with the data. This allows the engine to change source-based and/or destination-based routing information and modify data packets being routed through the protocol emulator 130. For example, the engine stores source and destination information in association with user information in the user cache 218 via the user cache interface. This allows a mapping to be made to default wireless access nodes based on either source or destination IP addresses. This allows the protocol emulator 130 to intercept packets before encapsulation or de-encapsulation and make intelligent decisions on delivery, security and filtering based, for example, on the identity of a sender and/or a receiver. In this way, the protocol emulator 130 may provide firewall functionality.

During encapsulation, the encapsulation engine can mark each encapsulated packet with an appropriate quality of service (QoS) marker. This emulation of QoS classes supported in a given broadband access system is related to subscription information associated with a particular user. This association is defined by, for example, a contractual relationship between a user and a service provider. As will be explained in greater detail below, the QoS marker is obtained during a connection establishment. For example, one or more QoS markers are included in subscription data associated with the user that is sent by a service provider during hand shaking related to a log on procedure. More than one QoS marker may be transmitted to allow the protocol emulator 130 to support multiple data sessions for a given user. For example, e-mail transmissions may be associated with a lower QoS level while video transmissions might be associated with higher quality of service markers. Data packets associated with IP addresses related to video traffic may be assembled along with high QoS level markers. Source and destination IP addresses associated with less time critical data result in a packet being assembled with a lower QoS marker.

As explained above, whether data is encapsulated or not and whether it is associated with a quality of service marker or not, data from the user devices destined for a broadband network are delivered to the queuing engine 222 via the services of the queuing interface. For example, the queuing interface may place data into the data buffer 230 for access by the queuing engine 222. The queuing engine 222 may retrieve data from the data buffer 230 based on its order of arrival and/or a priority or quality of service (QoS) marker.

The administration and maintenance module 214 performs billing and security functions of the protocol emulator and provides related information to, for example, the encapsulation engine of the protocol gateway 210. For instance, the administration and maintenance module 214 may include a dynamic host configuration protocol (DHCP) server and/or an HTML server. The HTML server may be used to provide generic information identifying the portable wireless gateway 108, as well as a logon screen for all users. The HTML interface includes scripting capability for securely using, for example, SSL HTTP to communicate with the user devices. If the administration and maintenance module 214 includes a DHCP server or DHCP relay, the DHCP server or DHCP relay assigns an internet protocol address to user devices during the period of initial access when the user device attempts to log on or obtain serves from the portable wireless gateway 108.

Alternatively, the DHCP server or DHCP relay is associated with the access points 116. In such embodiments, the administration and maintenance module 214 performs supervisory services for those DHCP servers or DHCP relays.

The protocol emulator 130 may include a maintenance interface for the delivery of parameters and configuration information to be used by the administration and maintenance module 214. Alternatively, such information can be delivered via the broadband access system (i.e., the transceiver 134). For example, such parameters and configuration information are stored in the database storage device 226. The administration and maintenance module 214 collects statistics regarding the operation of each module within the portable wireless gateway 108. For example, the administration and maintenance module 214 collects error frequency information and retry information for the access points 116 and the transceiver 134. This information can be reported to a central operation center such as a maintenance server of a third party service provider, autonomously, on a regular basis, or when the collected statistics exceed a threshold or alarm point. For example, the statistics are reported over the broadband interface (i.e., transceiver 134). A protocol used for such maintenance functions can be, for example, SNMP, CORBA, or Java based.

As will be explained in greater detail below, the HTML server of the administration and maintenance module 214 can transmit a logon screen to the user devices 112, thereby providing a means to request, for example, a user name and password from users attempting to use the portable wireless gateway 108 and provide a means for the user to enter such identifying information.

For billing purposes, the administration and maintenance module 214 can count bytes of data transferred both up-link and down-link on a per-user-flow basis.

Additionally, or alternatively, the administration and maintenance module 214 runs connection timers in association with each user. These byte count or connection time measurements are used to decrement from prepaid connection quantities or to generate user bills. If, during a connection, a byte count or connection timer exceeds a prepaid limit, the administration and maintenance module 214 may send signals to the protocol gateway 210 indicating that the protocol gateway should begin filtering data (i.e., blocking) bound for, or transmitted from, the associated user's device. Alternatively, the administration and maintenance module may direct the HTML server to send warning messages to users who are approaching their byte count or connection time limits. For example, the administration and maintenance module 214 may accept a credit card number or other information for recharging a prepaid account.

As mentioned above, the user cache 218 may include access control lists. As will be explained in greater detail below, each time a user successfully attaches to the portable wireless gateway 108 and associated networks, subscription data is transmitted from the network in regard to the user. A static portion of this data, such as, for example, a user name, password, and an equipment identification number (EIN#) may be stored in the user cache 218. This information is maintained in the user cache during the connection. Optionally, this information may be maintained in the user cache for a provisional or adjustable period of time after the user disconnects. The information may be maintained, for example, to allow for rapid reconnection. Additionally, this caching of user information reduces network traffic during reconnection.

In embodiments that use them, access control lists are maintained on the basis of previous authentication/connection attempts and/or on recognized malicious behavior.

The list may be configured or updated through a local maintenance interface or remotely via a secure administrative control interface over the broadband access system as mentioned previously. As explained above, the protocol gateway 210 accesses the user cache 218 to determine routing and filtering information.

The queuing engine 222 is used to facilitate quality of service (QoS) over the air interface (e.g. the main transceiver 134 and any associated network). The queuing engine fairly schedules all outgoing transmissions of data from the portable gateway 210. For example, the queuing engine 222 reorders data from the data buffer if the data is marked with a higher quality of service priority than other data that may have arrived earlier. The queuing engine 222 receives data from the protocol gateway 210 via an internal interface or buffer 230. For example, the buffer 230 interface may be shared memory. Shared memory is a high-speed means for providing an interface between devices. Preferably, the queuing engine is implemented in hardware for maximum throughput. If necessary, the queuing engine may drop packets in order to maintain quality of service for high-priority packets.

As mentioned above, the data buffer 230 between the protocol gateway 210 and the queuing engine 222 may be, for example, a shared memory. The data buffer 230 is used to temporarily store packets encapsulated or forwarded by the protocol gateway 210 that are waiting to be queued by the queuing engine 222. For example, data is stored in the data buffer 230 for a period of time on the order of milli-seconds.

The protocol emulator I/O 234 includes Layer 2 hardware and software for interfacing the protocol emulator 130 to the access points 116 and/or the switch 124 and the main radio transceiver 134. In some embodiments, the I/O also includes means for controlling an antennae array. Preferably, the protocol emulator I/O 234 is full duplex. As explained above, the protocol emulator I/O 234 may be connected to all devices in the portable wireless gateway 108 through a common back plane. Preferably, the protocol emulator I/O 234 operates at line speed and does not include buffers, storage devices or data queues.

In most embodiments and/or applications, the main radio transceiver 134 provides a communications link between the portable wireless gateway 108 and a wireless operator's network. Once connectivity is provided to a wireless operator's network, connections to any network associated therewith, such as, for example, the Internet or other data network is readily provided. The main radio transceiver 134 including any associated antennas provide an increase in effective radiated power over that available from the user devices 112 serviced by the PWG 108. Therefore, the main radio transceiver 134 provides an increase in communication range for the user devices 112. The main radio transceiver 134 is connected to the protocol emulator 130 via the protocol emulator I/O 234. The main transceiver 134 transmits data sent to it from the protocol emulator 130 and delivers data received over an air interface to the protocol emulator 130. The main radio transceiver 134 may include intelligence for appending and/or removing radio link control headers to data packets about to be transmitted and from data packets received via the air interface. Additionally, and/or optionally, the main radio transceiver 134 may include support for advanced capabilities of intelligent antennae or smart antennas.

With added reference now to FIG. 3, the portable wireless gateway 108 aggregates bandwidth demand from the plurality 112 of user devices by providing access points 116 for those user devices 112 and encapsulating data from those devices to make that data appear to be traffic from one or more devices associated with a preexisting wireless network. For example, Bluetooth or IEEE 802.11 wireless Ethernet data is encapsulated so that it appears to be UMTS, CDMA2000 or GPRS cellular wireless data. After encapsulation, the portable wireless gateway 108 transmits this data to a cellular wireless base station 314 associated with a wireless service provider 316. The base station 314 transmits the encapsulated data over a data network 318, as it would any other cellular wireless data, to a wireless service node 322. The wireless service node 322 may route the traffic to the public land mobile network, public switch telephone network, the Internet, or other networks, such as, for example, private data networks and virtual private networks. Additionally, the wireless service node may provide access to a mobile subscriber database 326 and/or a database 330 of a third party service provider 334. For example, these databases 322, 330 may be accessed when users attempt to logon or request services of the portable wireless gateway 108.

The portable wireless gateway 108 can be installed on a temporary, semi-permanent or permanent basis wherever there is a desire to aggregate bandwidth demand of mobile or portable devices and/or where there is a desire to extend the range of such devices. Users may prearrange for system access. However, the portable wireless gateway and its associated network can facilitate spontaneous access purchases.

For example, a user in the vicinity of a portable wireless gateway 108 may purchase an access card that carries a user name and password for accessing the portable wireless gateway 108 and associated communication networks. For instance, when a user turns on a laptop computer or personal digital assistant, the user device may search for network connectivity. In so doing, the user device may establish communications with one of the plurality 116 of access points of the portable wireless gateway 108. In response to this initial contact, the access point (e.g., 118, 120, 122) notifies the protocol emulator 130, through the services of the switch 124, of the existence of a new mobile device in its vicinity. The HTML server of the administration and maintenance module 214 may transmit a greeting screen to the user through the services of the access point (118, 120, 122). The greeting screen may indicate where in the vicinity a temporary user name and password might be purchased. Alternatively, the user may be granted immediate but temporary access in order to purchase access on line. In a further alternative, the protocol emulator may a add message to data sent to the user device by other sources. For example, the protocol emulator may add an advertisement message of a sponsor to a web page viewed by the user with the user device. For instance, the advertisements may subsidize or fully pay for the system access of the user. In this mode, the protocol emulator 130 detects HTTP protocols and insets the designated message or advertisement to the HTML code.

Portable gateways 108 may be installed in, for example, arenas, hospital campuses, college campuses, industrial campuses, convention centers, emergency sites, trains, buses, ships, airplanes, or any other location where there is a temporary or permanent demand for communications connectivity. The ability to spontaneously provision such connectivity spares users from having to preplan and provide for their connectivity needs.

The portable wireless gateway 108 provides for the aggregation of bandwidth demand and range extension of portable devices without requiring significant alteration of existing cellular networks. Existing cellular networks allow portable devices to connect to several destinations at once. For example, a laptop or portable digital assistant connected directly to a cellular network can download e-mail and retrieve information from a website simultaneously. The portable wireless gateway 108 takes advantage of this feature and allows a plurality of users to make a plurality of connections simultaneously. When the portable wireless gateway is activated, the protocol emulator 130 searches for network connectivity. For example, the portable emulator 130 uses the main radio transceiver 134 to contact a base station 314. In so doing, the protocol emulator may register as a single subscriber on the wireless operator network 316. Additionally, the protocol emulator may contact the third party service provider 334 through the services of the wireless operator network 316. Of course, the third party service provider 334 and the wireless operator network 316 may be one and the same. Alternatively, a third party service provider 334 may have a contractual arrangement with the wireless operator network 316.

During initialization, the protocol emulator 130 alerts the wireless network 316 that it is ready to manage connections. This initial connection may also serve as a control channel. The control channel may be a permanent connection or brought up as needed depending on system demand and network resources. For example, the portable wireless gateway 108 may be provisioned with an identity and/or telephone number in the wireless operator network 316 where it attaches. Once the portable wireless gateway 108 gains access to the wireless operator network 316, it may begin private data sessions to manage devices and service databases (e.g., 326, 330) to prepare for operation. Once network initialization is completed, the protocol emulator 130 may initialize the plurality 116 of access points and begins accepting connection requests from any user devices 112 within range. In some installations, the PWG 108 communicates with the base station 314 using standard communications protocols between a single mobile device and a base station. In other applications, where bandwidth demands are greater, the portable gateway may establish additional connections and, therefore, appear to be two, three or more mobile devices. In some applications, a portable gateway installation may be in range of two or more base stations. The inclusion of advanced antennae arrays in the portable wireless gateway system increases the likelihood of this situation. In these situations, the portable wireless gateway is able to access additional bandwidth by distributing traffic over a plurality of base stations.

The portable wireless gateway will now be described in greater detail by reference to operational scenarios.

Referring to FIG. 4, when a user device 410 of the plurality 112 of user devices searches for a network connection, an access point 420 of the portable wireless gateway 108 begins a point-to-point protocol negotiation (Layer 2) with the user device 410 to establish a point-to-point protocol (PPP) connection 424. When the PPP connection is established, the user device 410 begins sending 428 DHCPREQUEST messages. However, the DHCPREQUEST cannot as yet be fulfilled. Instead, the HTML server of the administration and maintenance module 214 is directed to send 432 an HTML sign on screen to the user device 410 using well known HTML/TCP/IP ports. Assuming the user has a user name and password, the user enters that information and sends 436 it back to the HTML server. The user name, password, and a Layer 2 MAC address (not shown) are stored 440 in the data storage device 226 of the protocol emulator 130. Additionally, the HTML server notifies the protocol gateway 210 of the existence of the user device 410 and that the user device 410 is requesting 444 access. The HTML server provides the protocol gateway 210 with a MAC address to identify the user that was provided 436 to the HTML server along with the user name and password.

As a first step to providing the user device 410 with access, the protocol gateway 210 sets up a private data connection 450 to the third party subscriber database 330. Additionally, the protocol gateway 210 acknowledges 454 that it received the access request 444 by sending an ACCess_ACK( ) message to the HTML server. The protocol gateway 210 then uses the private connection 450 to send 458 a User_ACCess_REQ message to the third party database 330 to retrieve an equipment identification number (EIN). The User_ACCess_REQ message includes the user name and password supplied by the user. If the user name and password supplied by the user through user device 410 is valid, the third party database 330 responds 462 with a user ACCess_ACK message. The ACCess_ACK message includes an EIN and other identifying and control information.

Alternatively, if this is a reconnection, the protocol gateway may retrieve an EIN for the user device 410 from the user cache 218.

The protocol gateway 210 stores 466 the EIN and identifying and controlling information either in the storage device 226 or in the user cache 218.

In a first mode of operation (mode 1), the EIN is associated with the portable wireless gateway 108, and the user device 410 is given a temporary and/or private IP address by the protocol gateway 210. The temporary and/or private IP address is associated with all packets from, or bound for, the user device 410, and the protocol gateway uses the temporary IP address to route traffic accordingly. That is, all communications between the portable wireless gateway 108 and the user device is network address translated (NAT).

In a second mode of operation (mode 2), the protocol gateway 210 stores a separate EIN for each of the plurality 112 of user devices. In either case, the portable wireless gateway 108 proxies the connection established for the user devices 112.

Figure 5:
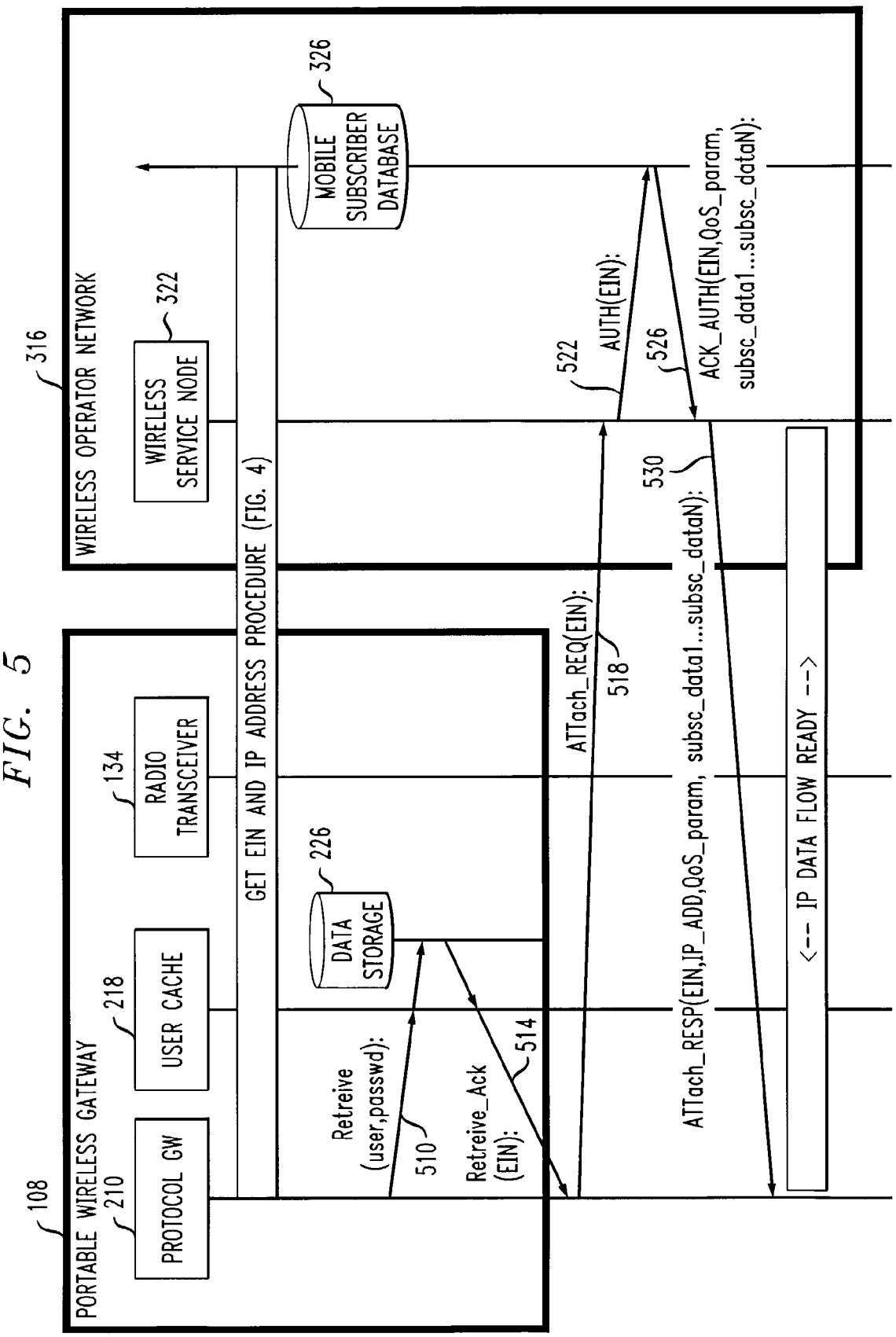
FIG. 5 is a call flow diagram illustrating a second part of an authorization procedure.

Referring to FIG. 5, in order to proxy a connection and authenticate the user device 410, the protocol gateway 210 requests the appropriate EIN by sending 510 a Retrieve message, including, for example, the user name and password associated with the user device 410 to the user cache 218 or the data storage device 226, as appropriate. The storage device 218, 226 responds 514 with the Retrieve_ACK message including the appropriate EIN. The protocol gateway 210 includes the EIN in an attach request 518 ATTach_REQ( ) sent to the wireless service node 322. The wireless service node 322 responds by sending 522 an authentication request (AUTH( )) to the mobile subscriber database 326. If the EIN is valid, the mobile subscriber database 326 replies 526 to the wireless service node 322 by acknowledging the authorization with an ACK_AUTH message. Parameters sent in conjunction with the ACK_AUTH message include the EIN and quality of service (QoS) markers associated with the EIN as well as other subscriber information. The wireless service node 322 uses this information to generate an attach response. The attach response includes the information or parameters sent by the subscriber database 326 as well as an IP address determined by the wireless service node 322. The generated message is sent 530 to the protocol gateway 210.

As was explained in reference in FIG. 4, the EIN was provided by the third party service provider 334. For example, the third party service provider may have purchased or leased a block of Equipment Identification Numbers from the wireless operator 316. The third party service provider temporarily assigns these EINs to portable wireless gateways 108 or user devices 112, 410, thereby providing the user devices 112, 410 with temporary authorization to use the services of the wireless operator's network 316. The procedures described in reference to FIG. 5 allow the wireless service provider to verify that authorization.

Figure 6:
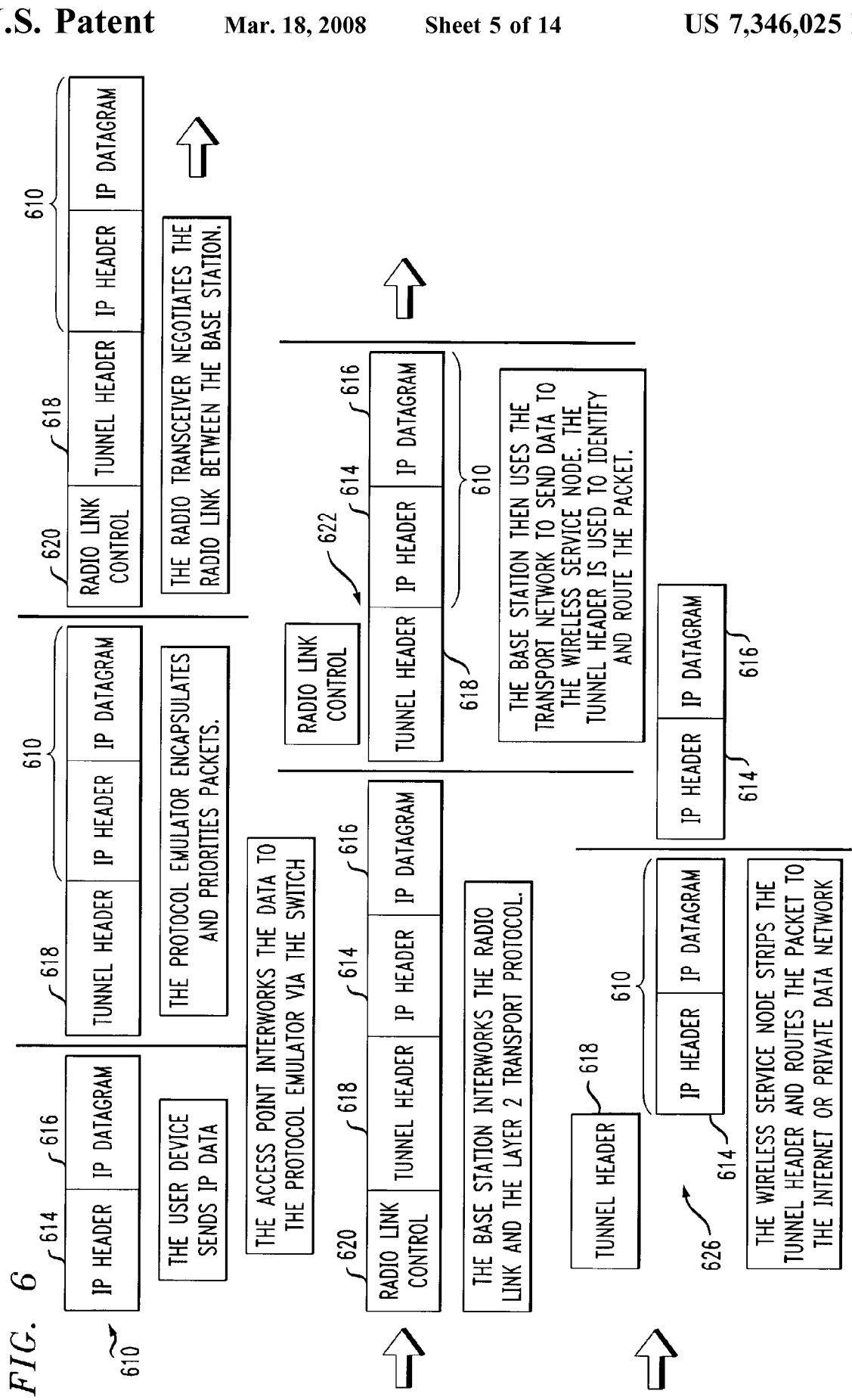
FIG. 6 is a diagram summarizing an encapsulation, transmission, de-encapsulation and routing process.

Referring to FIG. 6, once a user or user device is logged on or authenticated, the portable wireless gateway 108 encapsulates traffic from the user device so that the wireless operator network 316 can process it as if it were ordinary network traffic. For example, a user device 138 accesses the PWG 108 through one of the access points 116. For instance, the user device 138 may access the PWG 108 via the Bluetooth access point 120 and is authenticated as described above. From then on, data packets 610 from the user device 138 (see FIG. 1) are transmitted to the access point 120 and are delivered to the protocol emulator 130 through the switch 124. The data packets include, for example, an Internet protocol header 614 and an Internet protocol datagram 616. The IP header 614 includes a destination IP address and a source IP address. The destination address identifies the device or connection the datagram 616 is to be transmitted to. The source address identifies the user device 138. For example, the source address is used to direct a reply message. The protocol emulator 130 adds a tunnel header 618 to the packet 610. The tunnel header 618 may include, for example, a gateway ID (GWID) identifying the portable wireless gateway that will be sending the packet, a temporary subscriber ID (TSID) and may include an access domain network parameter (ADN). An access domain network parameter can direct the user data to a particular external data service. The protocol emulator 130 may also add a radio control link header 620 based on information it receives from the main radio transceiver 134. Alternatively, the main radio transceiver 134 may include the processing power necessary to determine and append the radio link control header 620. In either case, the radio link control header 620 includes information related to controlling RF power, radio frequency, handling radio link failures and other aspects of the air interface in cellular networks. When the user packet 610 is fully encapsulated, the main radio transceiver 134 transmits the packet 610 and the encapsulation information to the base station 314. The base station 314 then begins a de-encapsulation process by removing 622 the radio link control header 620 from the packet and routes the packet (610, 618) as indicated in the tunnel header 618. For example, the tunnel header 618 directs the packet to the wireless service node 322. The wireless service node 322 strips 626 the tunnel header 618 from the packet 610 and routes the packet 610 according to the destination information in the IP header 614. For example, the wireless service node 322 directs the packet 610 to a destination associated with the Internet or a private data network.

Any reply associated with the packet 610 is processed in the reverse manner. For example, the wireless service node would add a tunnel header to a packet received from the Internet or private data network. The base station 314 would add radio link control information to that packet and transmit it to the main radio transceiver 134 of the portable wireless gateway. The main radio transceiver 134 or the protocol emulator 130 will then strip off the radio link control header. The protocol emulator 130 will remove the tunnel header and direct the remaining information to the Bluetooth access point 120, which, in turn, will direct the information to the user device 138.

Figure 7:
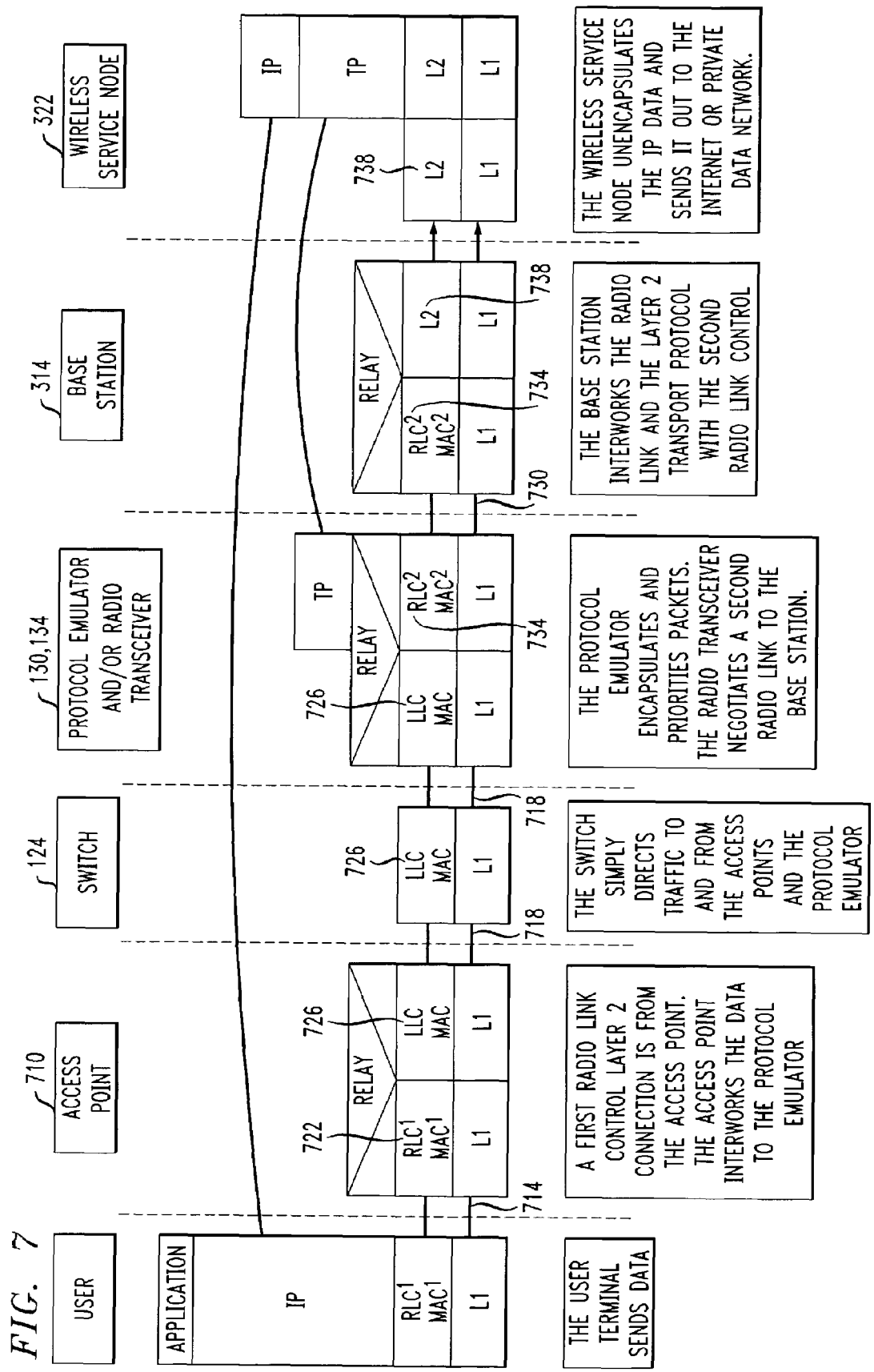
FIG. 7 is a protocol stack representation of the process of FIG. 6.

Referring to FIG. 7, from a protocol stack perspective process described in reference to FIG. 6 includes several relay stages. An access point 710 relays data received over an air interface 714 to an internal interface 718. For example, the access point 710 replaces a first radio link control Layer 2 connection 722 with a link layer control 726 associated with the internal connection 718. In so doing, the access point 710 interworks the data to the protocol emulator 130. The switch 124 simply directs traffic to and from the access point 120 and the protocol emulator 130. The protocol emulator 130, working perhaps in conjunction with the radio transceiver 134, acts as a second relay between the internal connection 718 and a second air interface 730. For instance, the protocol emulator 130 and/or radio transceiver 134 replace the link layer control 726 with a second radio link control Layer 2 connection 734. For example, the second radio link control Layer 2 connection 734 is a broadband cellular connection to the base station 314. The base station 314 interworks the radio link 734 and a Layer 2 transport protocol providing a connection between the base station and the wireless service node 322.

The tunneling referred to in FIG. 6 is managed slightly differently depending on whether the PWG 108 is operating in mode 1 or mode 2.

Figure 8:
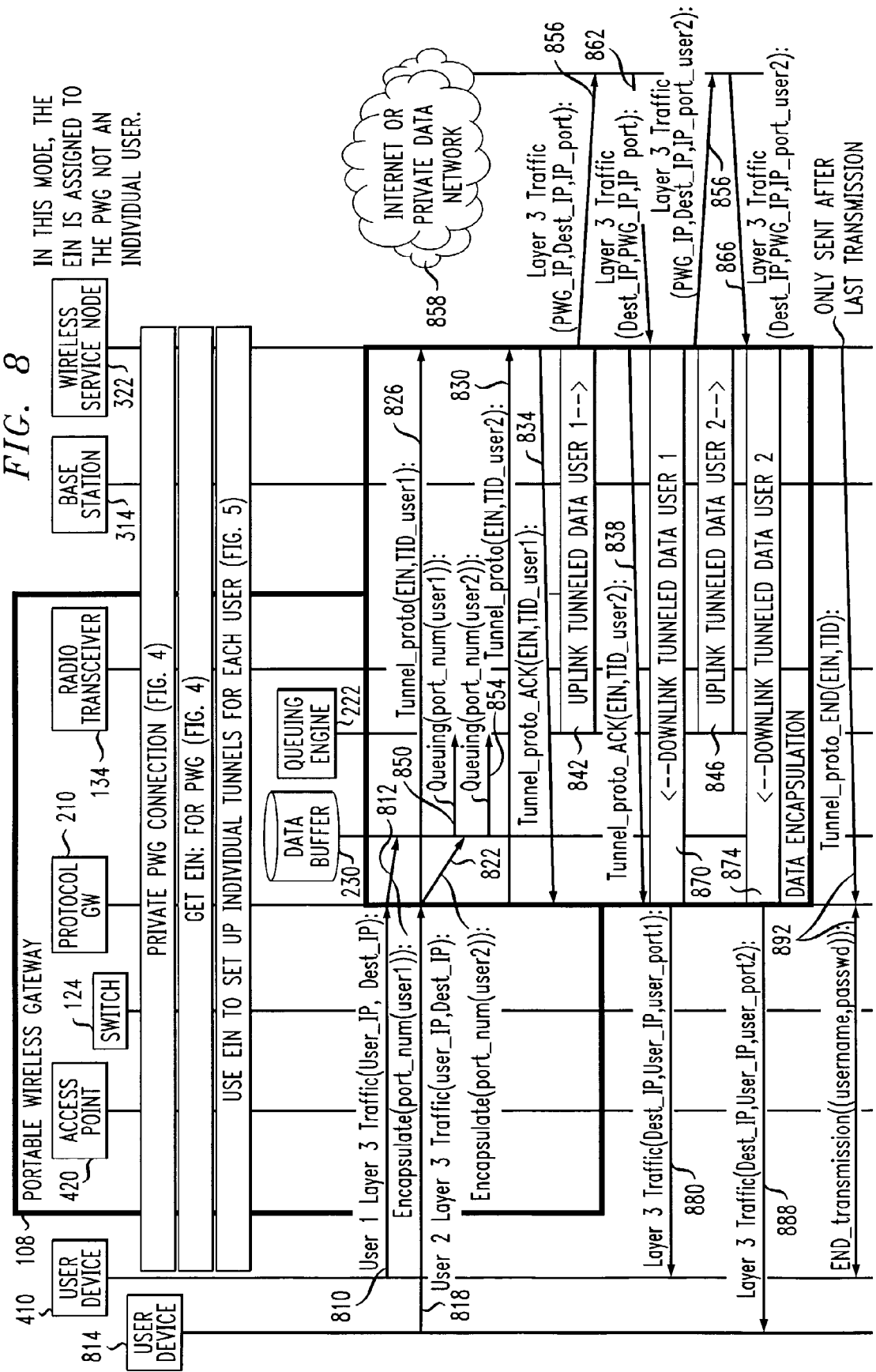
FIG. 8 is a call flow diagram illustrating tunnel set up and use in a first mode of operation of the portable wireless gateway of FIG. 1.

Referring to FIG. 8, in mode 1, EINs are assigned to the portable wireless gateway 108 and not individual devices of the plurality 112 of user devices. Further, the protocol emulator 130 authenticates multiple user sessions using a single EIN. Therefore, messages associated with tunneling must include parameters other than the EIN that identify the source and destination user devices. With reference to FIG. 4, at the end of the logon and authentication procedure, the protocol gateway 210 stores 804 an IP address in association with the MAC address of the user device 410. The DHCP server of the administration and maintenance module 214 is then able to respond 808 to the user device 410 with a DCHPACK message using that MAC address. The DCHPACK message provides the user device 410 with a user IP address. Of course, other Layer 3 protocols may be substituted for IP. The delivery of the user IP address to the user device 410 establishes the individual user connection. From this point, all data can be Layer 2 switched between the user device 410 and the protocol emulator 130. Layer 3 traffic from the user device 410 can now be routed 810 to the protocol gateway 210. That traffic is then encapsulated and sent to 812 the data buffer 230. The encapsulation includes associating the traffic with a port number specific to the first user device 410. Data from other user devices may be handled simultaneously. For example, data from a second device 814 may also be routed 818 to the protocol gateway 210 where it is encapsulated and stored 822 in the data buffer 230. Again, the encapsulation is in association with a port number specific to the second user device 814. The queuing engine 222 uses the port numbers and possibly quality of service markers, and/or source IP address, to schedule packets to be transmitted by the radio transceiver 134. Scheduling algorithms such as weighted fair queuing can be used by the queuing engine 222. If necessary, the queuing engine 222 may drop lower priority packets to ensure enough resources are available for higher quality packets.

As encapsulation and storage is proceeding 812, 822, the protocol gateway 210 also sends a tunnel setup message 826, 830 for traffic from the respective user devices 410, 814. The tunnel setup messages 826, 830 are directed at the wireless service node 322 and include an EIN of the portable wireless gateway 108 as well as a tunnel identifier which is specific for each respective user device 410, 814. The wireless service node 322 responds with Tunnel_proto_ACK messages 834, 838. The Tunnel_proto_ACK messages 834, 838 include the EIN of the portable wireless gateway 108 and the respective tunnel identifiers associated with the respective user devices 410, 814. The Tunnel_proto_ACK messages 834, 838 may also include other information about the tunnels depending on the standards and the tunneling protocols involved. The Tunnel_proto_ACK messages establish uplink tunnels 842, 846 for the respective user devices 410, 814. Once the tunnels 842, 846 are established, the queuing engine 222 can uplink 850, 854 buffered data through the tunnels 842, 846 based on whatever queuing algorithm is being applied.

As explained above, when the wireless service node 322 receives the tunneled data from queuing engine 222, the wireless service node 322 unencapsulates it and sends 856 the remaining Layer 3 data toward its destination such as, a node on the Internet or private data network 858. That traffic is sent 856 in conjunction with the destination IP address, an IP address for the portable wireless gateway 108 and an IP port address associated with the respective user 410, 814. Any reply information returned 862, 866 from the Internet or private data network 858 is also sent in conjunction with the portable wireless gateway 108 IP address, the transmitting node (with the original destination IP address) and the IP port address of the respective user device 410, 814. The wireless service node 322 establishes downlink tunnels 870, 874 for data destined for each user device 410, 814. Additionally, the wireless service node 322 encapsulates the data and tunnels it back to the protocol gateway 210 via the services of the base station 314 and main radio transceiver 134.

The protocol gateway 210 further unencapsulates the traffic and sends Layer 3 data 880, 888 to the respective user devices 410, 814 based on the user IP addresses and/or user port numbers.

The user devices 410, 814, the portable wireless gateway 108, the wireless service node 322 or other network elements can decide to tear down 892 the tunnels 838, 846, 870, 874 for various reasons. For example, tunnels can be torn down when a data flow from a user device or from a destination network node stops.

Figure 9:
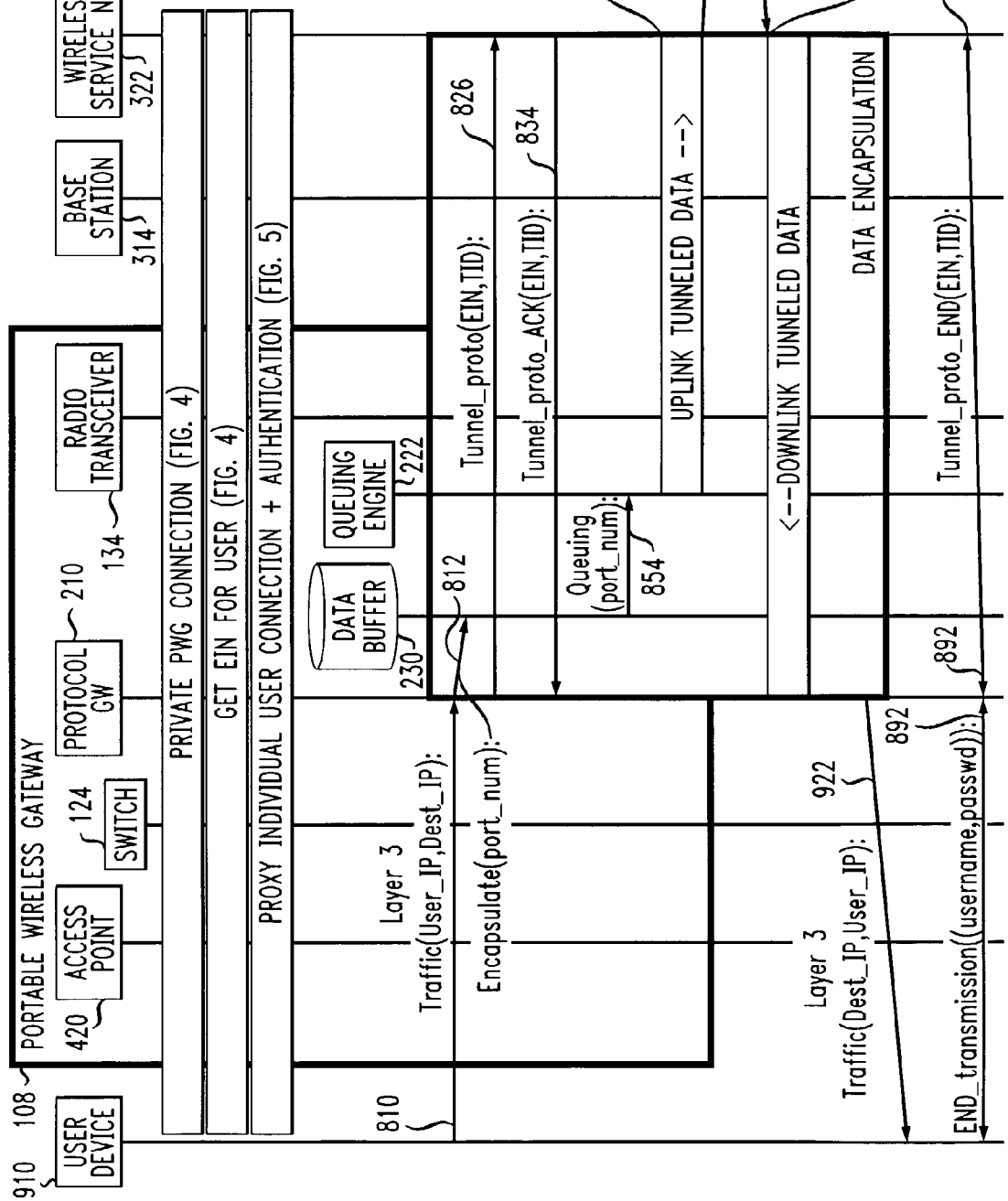
FIG. 9 is a call flow diagram illustrating tunnel set up and use in a second mode of operation of the portable wireless gateway of FIG. 1.

Referring to FIG. 9, in mode 2, each user device in the plurality 112 of user devices is associated with its own equipment identification number (EIN). The EIN uniquely identifies a user device 910.

In mode 2, call flow is similar to mode 1, including routing 810 data from the user device to the protocol gateway encapsulating and sending 812 traffic to the data buffer 230, tunnel setup 826, tunnel acknowledgement 834 and data uplinking 854. However, in mode 2, when the wireless service node 322 receives the tunneled data, unencapsulates it and sends 914 the remaining Layer 3 data toward its destination, the IP port address is no longer important. In mode 2, the EIN fully identifies the user device 910. Therefore, the user IP address associated with the EIN also fully defines the user device 910. Any IP port address associated with a traffic message 914 carries only redundant information. Similarly, any IP port information related to the user that might accompany a response 918 would also be redundant. Therefore, when the protocol gateway 210 unencapsulates the response traffic and sends 922 the traffic to the user device, the routing of that traffic need only be based on the user IP address.

As mentioned above, the portable wireless gateway 108 encapsulates data packets from a plurality 112 of user devices, and in so doing, acts as a proxy for those devices 112. The wireless operator network 316 in communication with a wireless gateway 108 operates as if it is in communication with one or, perhaps, a plurality of cellular devices. Therefore, the portable wireless gateway 108 can be used in mobile applications.

Figure 10:
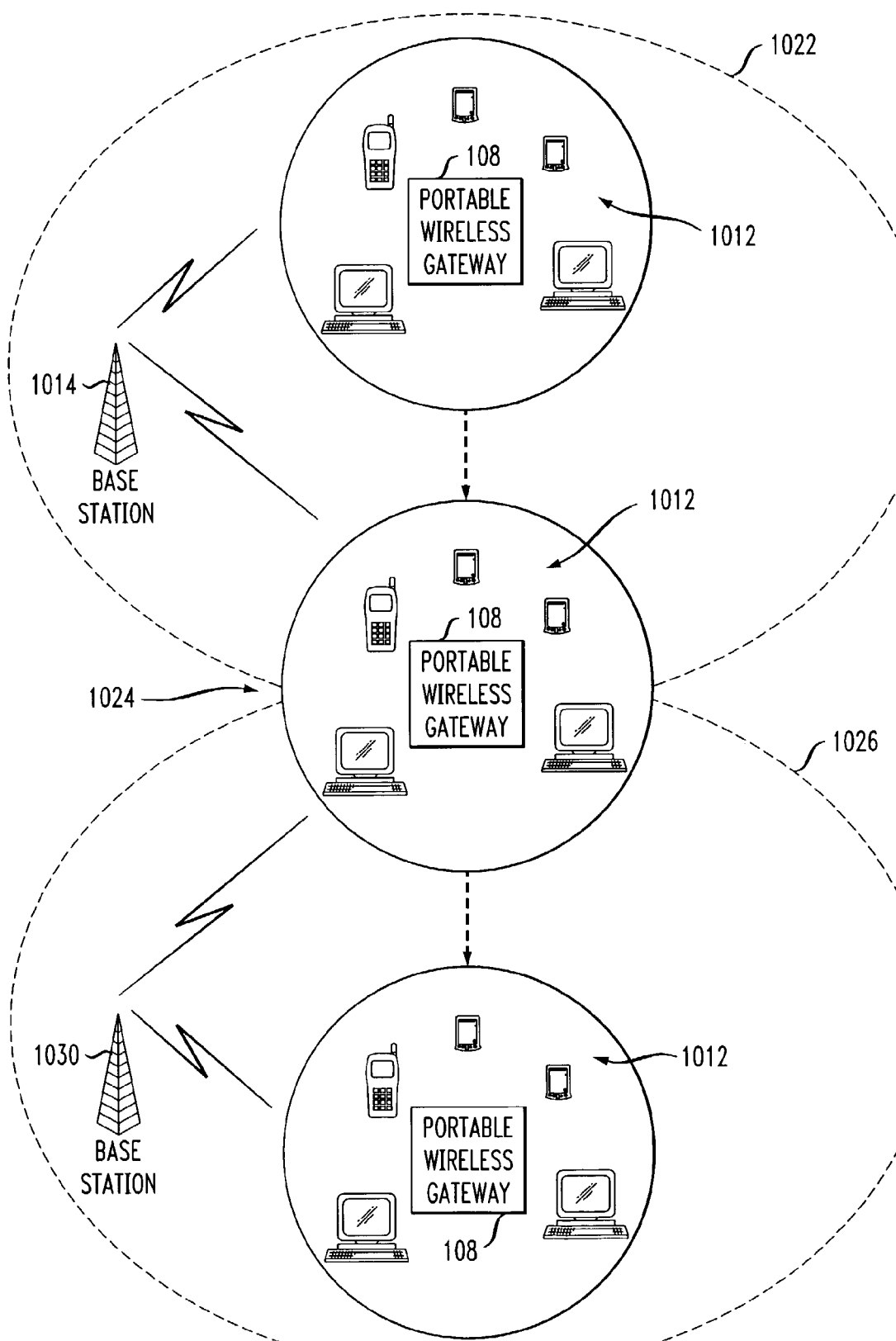
FIG. 10 is a block diagram showing portable wireless gateway of FIG. 1 installed on a mobile platform.

For example, referring to FIG. 10, the portable wireless gateway 108 is installed on a moving vehicle. For example, the PWG 108 is installed on a bus, train, ship, plane or other moving platform associated with a plurality 1012 of user devices that benefit from network connectivity. The PWG 108 acts as a proxy for that plurality 1012 of user devices by encapsulating their data as described above. Therefore, the plurality 1012 of user devices may appear to be a single cellular device (mode 1) or a plurality of cellular devices (mode 2) to a wireless operator network associated with a first base station 1014. The base station 1014 maintains contact with the PWG 108 as it moves 1018 through a first routing area 1022 associated with the first base station 1014. For example, parameters associated with radio link control headers tied to packets transmitted between the portable wireless gateway 108 and the first base station 1014 will carry instructions for increasing and decreasing transmitter power or changing antennae selections just as they would for any mobile device(s) moving through the first routing area. As the vehicle carrying the PWG 108, and the plurality 1012 of user devices traveling with it, reach a boundary area 1024 between the first routing area 1022 and a second routing area 1026 associated with a second base station 1030, the PWG 108 is handed off to the second base station 1030 as if it were a standard cellular device (or plurality of devices). For example, packets bound for one of the plurality 1012 of devices might be routed to both the first 1014 and second 1030 base stations during a handoff period associated with the movement 1018 of the vehicle. In this way, dropped or lost packets are prevented.

Figure 11:
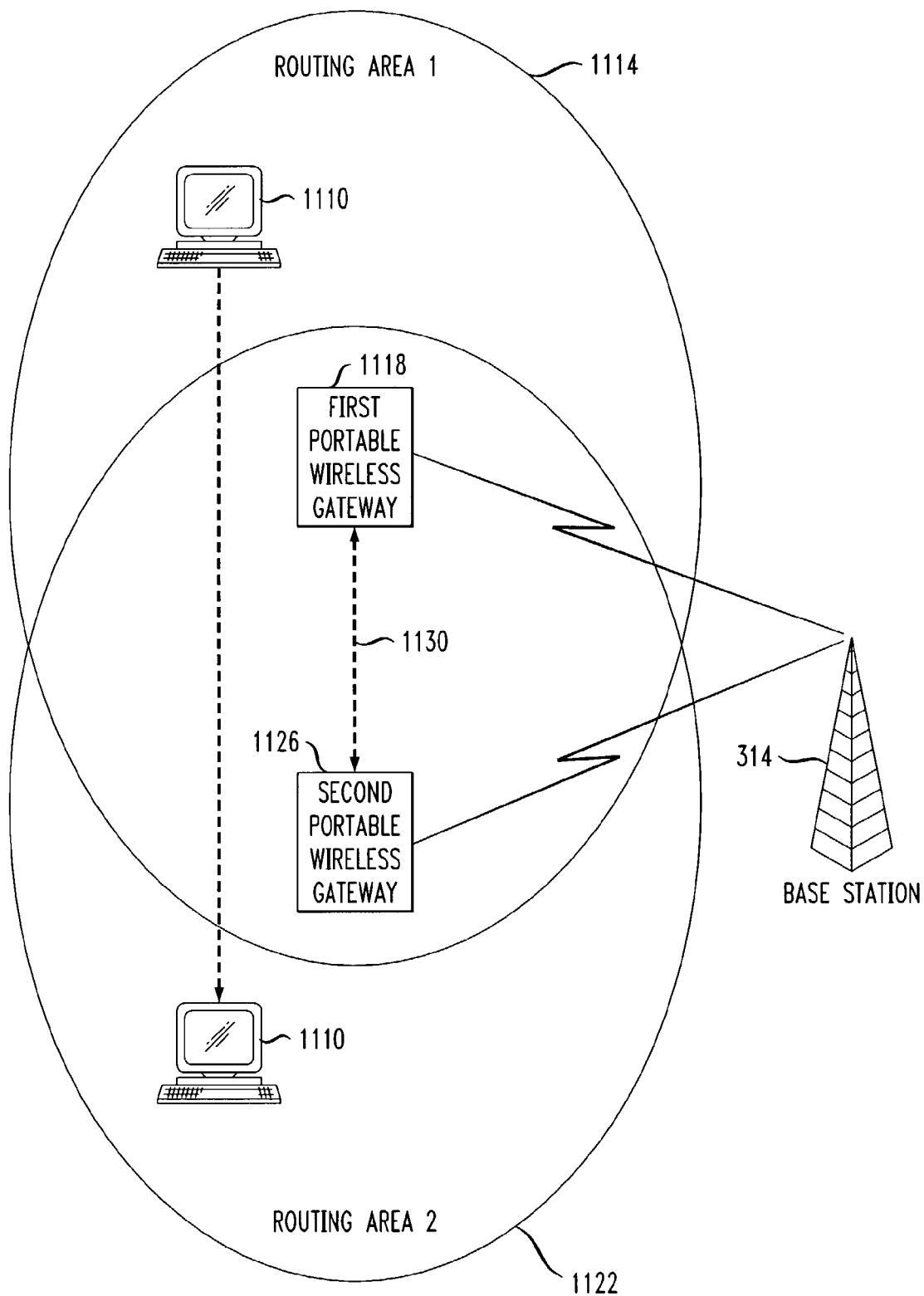
FIG. 11 is a block diagram showing a first and second portable wireless gateway installed within range of one another, a user device moving between them and being handed off from the first portable wireless gateway to the second portable wireless gateway.

Referring to FIG. 11, just as a portable wireless gateway 108 and associated plurality 1012 of user devices can move from a first routing area 1022 of a first base station 1014, there may be applications where a user device 1110 moves from a first routing area 1114 of a first portable wireless gateway 1118 to a second routing area 1122 of a second portable wireless gateway 1126. For example, the portable wireless gateways 1118, 1126 might be distributed around a large convention center, stadium, or emergency site. The user device 1110 might be a laptop computer or personal digital assistant carried by a user moving throughout the location. In such an application, the first portable wireless gateway 1118 must hand over the user device 1110 to the second portable wireless gateway 1126.

For instance, each portable wireless gateway 1118, 1126 is equipped with a similar plurality of access points 116. Therefore, each PWG 1118, 1126 includes an access point for communicating with the user device 1110. For example, each portable wireless gateway 1118, 1126 includes a Bluetooth access point 120. Additionally, it is assumed that the portable wireless gateways 1118, 1126 are arranged so that their routing areas 1114, 1122 overlap to some extent. If the routing areas 1114, 1122 overlap, then the access points 116 of the first PWG 1118 can communicate with the access points 116 of the second PWG 1126. As mentioned above, the access points 116 have peer-to-peer communications capabilities. That is, a Bluetooth access point 120 of the first PWG 1118 can communicate with a Bluetooth access point 120 of the second PWG 1126. This allows the peer access points to establish a wireless control link 1130 between themselves. Alternatively, a control link could be established with the services of the protocol emulators 130, main radio transceivers 134, the base station 314 and the wireless service node 322.

The access points (e.g., 120) can detect when a handover situation is occurring. For example as the user device 1110 moves from the first routing area 1114 to the second routing area 1122, the access point 120 of the first PWG 1118 detects a reduction in signal strength. At the same time, the access point 120 of the second PWG 1126 begins to detect a signal from the user device 1110. The access points 120 use the wireless control link 1130 between them to confirm the handover situation. With the handover situation confirmed, the access points inform their respective protocol emulators 130 that a handover from the first PWG 1118 to the second PWG 1126 is occurring. For example, the first access point 120 informs the first protocol emulator 130 through a Handover_Req message. The Handover_Req message includes the MAC address of the user device 1110 and a cause parameter set to, for example, —leaving—. Similarly, the access point 120 of the second PWG 1126 informs its respective protocol emulator 130 Handover_Req with a message including the same MAC address and a cause parameter set to, for example, —entering—. The protocol emulator of the first PWG 1118 responds with a Handover_Res message including a GWID, EIN, TID, IP_add and subscriber data. The parameters supplied with the Handover_Res message are supplied, for example, from the user cache 218. The access point from the first PWG 1118 relays the Handover_Res message to its peer access point in the second PWG 1126. In turn, the peer access point relays the information in the Handover_Res message to the protocol emulator 130 of the second PWG 1126.

The protocol emulator 130 of the second PWG 1126 sets up a secondary tunnel using the EIN of the user device 1110 received from the first PWG 1118. For example, in a method similar to that described in reference to FIGS. 5, 8 and 9, the protocol emulator of the second PWG 1126 transmits an attach request message to the mobile subscriber database 326. The attach request message includes parameters such as the EIN of the user device 1110, an IP address associated with the user device 1110 and a tunnel type. For example, the tunnel type is —secondary—. No data is transferred on the secondary tunnel at this stage. A secondary tunnel is defined as a tunnel assigned to an EIN that already has a primary tunnel associated with it. Typically, secondary tunnels have different characteristics associated with them than does the primary tunnel. For instance, a secondary tunnel might have a different QoS than the primary tunnel. User data is transferred in secondary tunnels during mode 1 operation. In this application, instead of setting up a secondary tunnel for each different individual user device, the secondary tunnel set up here is set up for the same user device 1110 as the tunnel previously established between the wireless service node 322 and the first PWG 1118. This procedure allows a handover to be accomplished without changing an IP address associated with the user device 1110. Therefore, the handover can be transparent to any device the user device 1110 might be in communication with, for example, over the Internet.

When the new tunnel is established, the protocol emulator of the second PWG 1126 sends the protocol emulator of the first PWG 1118 an Insert_subs message. For instance, the Insert_subs message includes an EIN parameter, the TID originally associated with the user device 1110 and a second TID (TID 2) associated with the recently established tunnel. The Insert-subs message tells the first PWG 1118 that the second PWG 1126 is ready to handle the tunnel of the user device 1110 associated with the EIN and first TID number, and that the first PWG 1118 should begin forwarding uplink data to TID 2. During this phase, downlink data is still being received at the first PWG 1118 and transmitted to the user device 1110 through the access point associated therewith.

The second PWG 1126 sends a Tunnel_proto_mod message to the wireless service node 322. The Tunnel_proto_mod message includes the EIN of the user device 1110, the first TID and the second TID (TID 2). The Tunnel proto_mod message instructs the wireless service node 322 to move the tunnel. The wireless service node 322 responds with a Tunnel_proto_mod_ACK message. The Tunnel_proto_mod_ACK message includes the EIN of the user device 1110 and TID 2. The T Tunnel_proto_mod_ACK message indicates that all downlink data is now tunneled through TID 2 to the user device through the second PWG 1126. Whatever network the user device 1110 is in communication with (e.g., the Internet) is unaware of any change. All necessary rerouting is handled by the PWGs 1118 and 1126 and the wireless service node 322. From this point, traffic is transferred to the newly established tunnel in a manner similar to that described in reference to FIGS. 9 and 10. The second PWG 1126 sends a Handover_complete message including the EIN and first TID number to the first PWG 1118. The first PWG 1118 can then end the remaining data connection associated with the user device 1110 by sending a Tunnel proto_End message including the EIN and first TID to the wireless service node 322. The first PWG 1118 may also send and END_transmission message to the user device 1110 if it is still within range.

As mentioned above, one or more of the plurality 116 of access points might be a cellular wireless access point. In that case, data from a cellular wireless device might be handled much the same way as data from any other device as described above. Alternatively, the main radio transceiver 134 might act as an access point for a device operating on a cellular wireless protocol.

Figure 12:
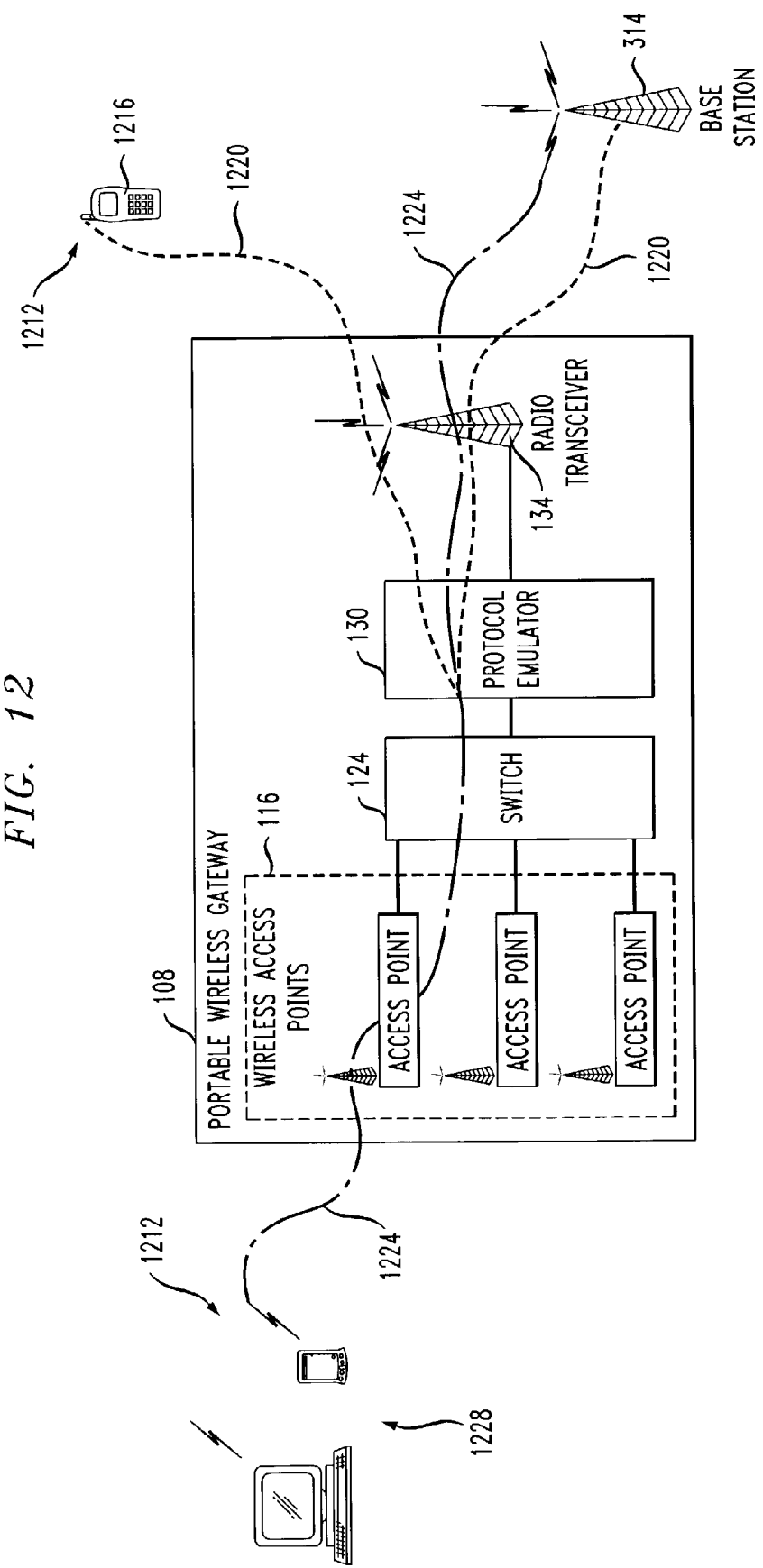
FIG. 12 is a block diagram illustrating a portable wireless gateway relaying data to and from a cellular device while also encapsulating and transporting data from other user devices.

For example, referring to FIG. 12, a plurality of devices 1212 are in the vicinity or routing area of a portable wireless gateway 108. One of the devices of the plurality 1212 is a cellular wireless device 1216. For example, the cellular wireless device 1216 is a cellular telephone. Packets from the cellular telephone 1216 are received by the main radio transceiver 134 and passed on to the protocol emulator. As will be explained in greater detail below, either the main radio transceiver 134 or the protocol emulator may recognize the packets to be from a cellular telephone attempting to contact a base station. For example, the main radio transceiver 134 may monitor transmissions from the cellular telephone 116 for a period of time to determine whether or not the cellular telephone 1216 is able to reach a base station. If the cellular telephone 1216 is unable to reach a base station, the main radio transceiver 134 notifies the protocol emulator 130. The HTML server generates a logon screen which is transmitted via the main radio transceiver to the cellular telephone 1216. For example, the logon screen offers range-extending retransmission services to the user of the cellular telephone 1216 and explains how to obtain a user name and password. Once the user device 1216 is validated or authenticated, data packets 1220 to and from the cellular telephone 1216 are carried along with data packets 1224 to and from other user devices 1228 of the plurality of 1212 of user devices to and from the base station 314.

Some embodiments preserve bandwidth consumed in this process by detecting the frequencies used by, for example, the cellular device 1216 and overlapping the radio link between the portable wireless gateway 108 and its serving base station 314 on those same frequencies.

Figure 13:
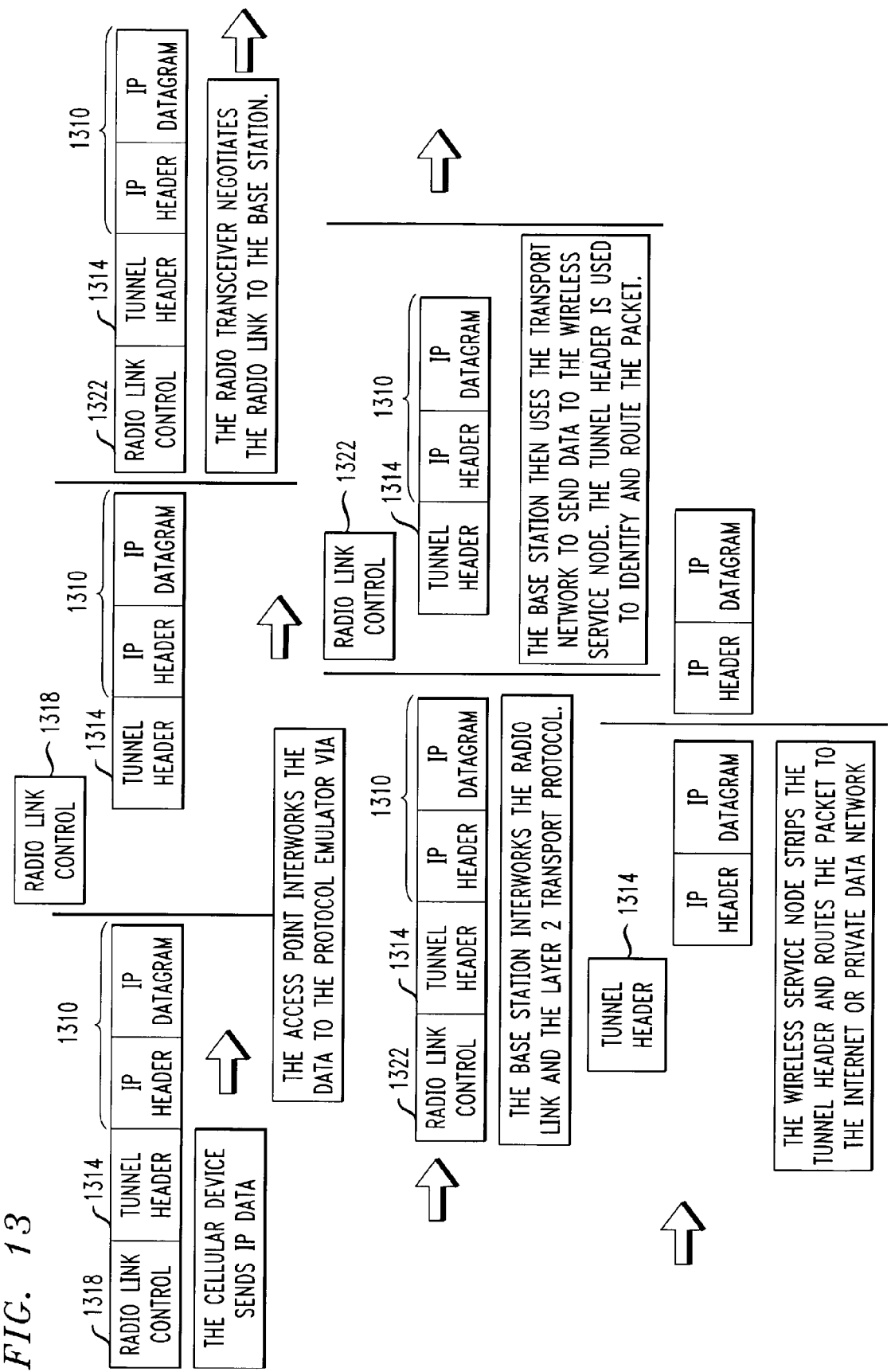
FIG. 13 is a diagram summarizing an encapsulation, transmission, de-encapsulation and routing process associated with the application illustrated in FIG. 12.

Referring to FIG. 13, cellular packets 1310 received from the cellular device 1216 are associated with a tunnel header 1314 and a radio linked control header 1318. When a decision is made to retransmit the data packet 1310 from the cellular device 1216, for example, after the cellular device 1216 has been authenticated or logged on, information from cellular device 1216 is processed for retransmission. For example, the main radio transceiver 134 or the protocol emulator remove or disassociate the radio link control header 1318 from the data packets 1310 while at the same time recording parameters from the radio link control header 1318. A new radio link control header 1322 is then associated with the data packet 1310. The new radio link control header 1322 includes similar parameter values as the original radio link control header 1318. However, parameters associated with transmitter power and/or transmission frequency may be changed. From this point onward, the packet assembly (1322, 1314, 1310) is transmitted and routed in a manner similar to the packet assembly (620, 618, 610) described in reference to FIG. 6. When information is received from the base station 314 that is destined for the cellular device 1216, then the process described above is carried out in the reverse direction. The radio link control header received from the base station 314 is removed and replaced with a new radio link control header with parameters that are appropriate for the radio link between the main radio transceiver 134 and the cellular device 1216.

Some locations where bandwidth demand might be aggregated may be out of range of a cellular base station, even with the increased power and high gain antennas providable by a portable wireless gateway. However, some of these locations may be wireless local area network hot spots. That is, some locations out of the range of a cellular base station may be within range of a wireless local area network having connectivity to a wireless service node. Under those circumstances, a portable wireless gateway can be configured either manually or automatically to take advantage of the wireless local area network (WLAN) to provide connectivity and aggregate bandwidth demand.

Figure 14:
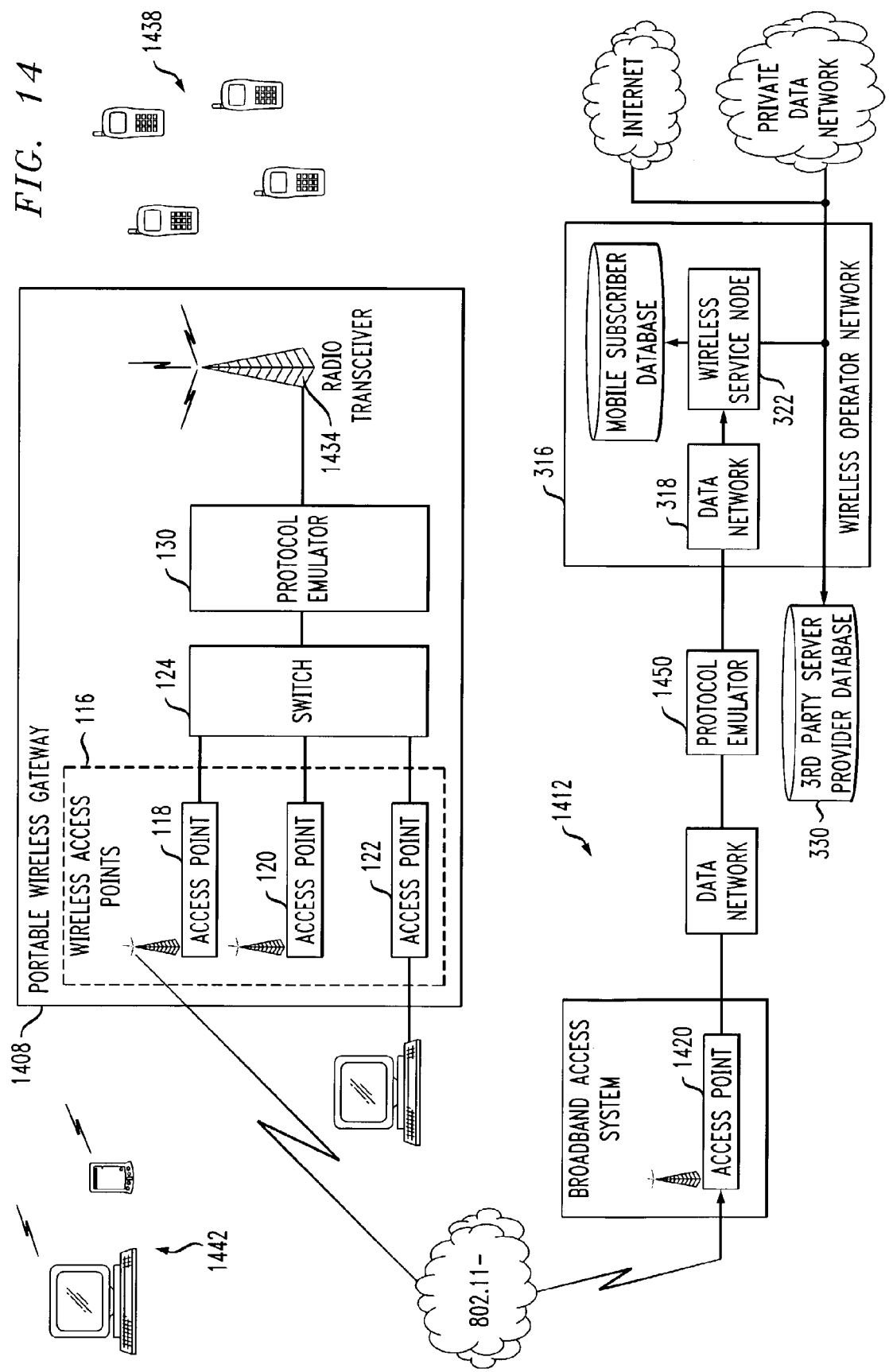
FIG. 14 is a block diagram illustrating a portable wireless gateway taking advantage of a WLAN to route traffic to and from a wireless service node.

For example, referring the FIG. 14, a portable wireless gateway 1408 uses the IEEE 802.11 access point 118 to provide connectivity to a WLAN 1412 having connectivity to a wireless service node such as, for example wireless service node 322. In such applications, logon procedures and general operation is similar to those applications described above. However, instead of routing traffic to a wireless service node via an air link between a main radio transceiver 134 of the portable wireless gateway 1408 and a base station, traffic is routed to the wireless service node 322 via the WLAN 1412. Traffic flows between the portable wireless gateway 1408 and the WLAN 1012 via an air link between one of the plurality 116 of access points and an access point 1420 of the WLAN 1012.

For example, the access point 1420 of the WLAN 1412 may be an IEEE 802.11 access point, and data is transferred between the access point 1420 and the IEEE 802.11 access point 118 of the portable wireless gateway 1008. In this regard, the access point 118 may also be considered a main radio transceiver. A radio transceiver 1434 of the portable wireless gateway is simply an access point for cellular devices 1438 within the vicinity or routing area of the portable wireless gateway 1408. In this regard, the portable wireless gateway 1408 in general, and the protocol emulator 130 in particular, performs or simulates the functions of a base station from the point of view of the cellular devices 1438. The protocol emulator 130 of the PWG 1408 establishes a virtual private network to a service provider's data network through the access point 1420 and wide local area network 1412 and performs the functions or simulates a base station communicating with the wireless service node or gateway 322. The protocol emulator 130 encapsulates data from the cellular devices 1438 and other user devices 1442 being served by the portable wireless gateway 1408 in a manner similar to that described above with the exceptions that one of the plurality 116 of access points (e.g. 118) serves as the main radio transceiver, that the air link is not to an ordinary base station, and that instead of adding or manipulating radio link control headers the protocol emulator associates data packets with other kinds of headers, such as, for example Virtual Private Network IP headers.

In this regard, the WLAN 1412 may have to be modified to route data from the PWG 1408. For example, the WLAN is modified to include a stand-alone protocol emulator 1450. The stand-alone protocol emulator 1450 acts as a interface between the WLAN 1412 and the data network 318 of the wireless service provider 316. The PWG 1408 add VPN headers to data packets to route the packets to the stand-alone protocol emulator 1450. The stand-alone protocol emulator 1450 removes the VPN headers and routes the data on toward the wireless service node 322.

Figure 15:
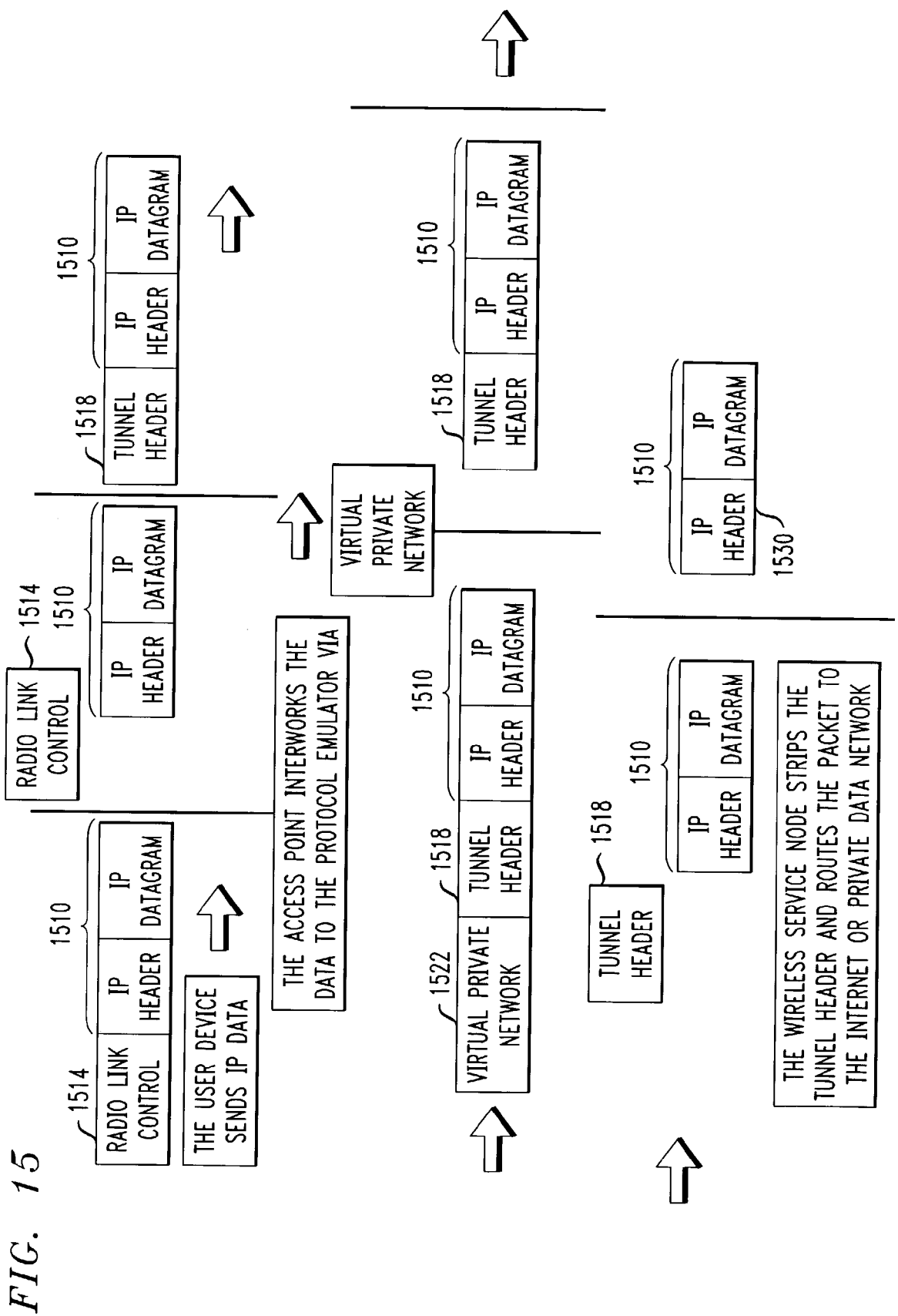
FIG. 15 is a diagram summarizing an encapsulation, transmission, de-encapsulation and routing process associated with the application illustrated in FIG. 14.

For example, referring to FIG. 15, a user device communicates with a wireless access point (e.g. 118, 120). Data 1510 from the user device includes a Radio Link Control header (RLC) 1514. The access point (e.g. 118, 120) removes the RLC 1514 from the data 1510 and interworks the data 1510 to the protocol emulator 130. The protocol emulator 130 adds a tunnel header 1518 for routing the data 1510 to the wireless service node 322. Additionally, the protocol emulator 130 adds a Virtual Private Network IP (VPN) header 1522 to the data 1510 to route the data 1510 through the pre-existing WLAN 1412 to the interface or stand-alone protocol emulator 1450. The interface or stand-alone protocol emulator 1450 removes the (VPN) header 1522 and interworks the data 1510 toward the wireless service node 322. In turn, the wireless service node removes the tunnel header 1518 and routes the data toward a destination device according to an IP header 1530 associated therewith. As explained above, in reference to FIG. 6 and FIG. 13 data returned from the destination device is processed in a similar but reverse manner.

The invention has been described with reference to the preferred embodiments. Modifications and alterations will occur to others upon reading and understanding this specification. For example, while transceivers have been referred to, embodiments can be made using separate receiving and transmitting devices. It is intended that the invention be construed as including all such modifications and alterations insofar as they come within the scope of the appended claims or the equivalents thereof.

We claim:

1. A portable wireless gateway comprising:
   at least one access point that communicates with user devices;
   a transceiver that communicates with a network; and,
   a protocol emulator comprising:
   a protocol gateway that determines an authorization of respective user devices to receive services from the portable wireless gateway, wherein the protocol gateway contacts a third party subscriber database, via the network, on behalf of the respective user devices, to verify a validity of a user name and password received from the user device at least one time and, when the respective user devices are authorized to receive the services of the portable wireless gateway according to information received from the third party subscriber database, the protocol gateway encapsulates user device data of the respective authorized user devices relayed by the at least one access point to prepare the user device data for transmission by the transceiver in a protocol associated with the network in communication with the transceiver, and unpackages data from the network relayed by the transceiver for delivery to the at least one access point and relaying to at least one of the user devices.

2. The portable wireless gateway of claim 1 wherein the transceiver comprises
   a radio transceiver that communicates with a public mobile data network.

3. The portable wireless gateway of claim 1 wherein the protocol emulator is controls and coordinates radio frequencies used by the at least one access point.

4. The portable wireless gateway of claim 1 wherein the protocol emulator is assigns a private IP address to a user device using network address translation.

5. The portable wireless gateway of claim 1 further comprising:
   an administration and maintenance module that performs billing and security functions in conjunction with the protocol gateway.

6. The portable wireless gateway of claim 5 wherein the administration and maintenance module autonomously communicates with a maintenance server of a third party service provider for uploading billing information and downloading administration and maintenance information.

7. The portable wireless gateway of claim 5 wherein the billing and security functions include at least one of recording a connection time of the user device and recording a traffic volume associated with the user device.

8. The portable wireless gateway of claim 5 wherein the protocol gateway and administration and maintenance module cooperate to provide firewall functionality for the user device.

9. The portable wireless gateway of claim 5 wherein the administration and maintenance module comprises:

a dynamic host configuration protocol server.

10. The portable wireless gateway of claim 5 wherein the administration and maintenance module comprises:
an HTML server that supplies log on screens for delivery to user devices and receives and processes log on information therefrom.

11. The portable wireless gateway of claim 10 wherein the protocol gateway, administration and maintenance module and the HTML server cooperate to provide a user with temporary access to the services of the portable wireless gateway to allow the user to purchase longer term access to the services of the portable wireless gateway online.

12. The portable wireless gateway of claim 2 wherein the radio transceiver comprises a wireless telephone based broadband communications link.

13. The portable wireless gateway of claim 1 wherein the protocol gateway encapsulates data so as to act as a proxy for the user devices.

14. The portable wireless gateway of claim 1 wherein the at least one access point comprises:
at least one of an IEEE 802.11 access point, a Bluetooth access point, a HiperLan access point.

15. The portable wireless gateway of claim 1 wherein the portable wireless gateway establishes a respective plurality of connections with the network via the transceiver, thereby appearing to the network to be a respective plurality of mobile devices.

16. The portable wireless gateway of claim 1 wherein the at least one access point comprises:
a UMTS Node B access point.

17. The portable wireless gateway of claim 1 wherein the transceiver comprises a UMTS based transceiver.

18. The portable wireless gateway of claim 1 wherein the transceiver comprises a CDMA 2000 based transceiver.

19. The portable wireless gateway of claim 2 wherein the radio transceiver comprises a fixed wireless based communications link.

20. The portable wireless gateway of claim 1 wherein the protocol emulator further comprises:
a queuing device that queues traffic based on quality of service parameters associated with the traffic.

21. The mobile network gateway of claim 20 wherein the queuing device is operative to prevent denial of service to user devices associated with a high quality of service.

22. The portable wireless gateway of claim 1 wherein the at least one access point and the protocol gateway negotiate a user device handover to or from another portable wireless gateway device when a comparison of a first signal strength between the user device and the at least one access point and a second signal strength between the user device and an access point of the other portable wireless gateway indicates that a handover is warranted.

23. The portable wireless gateway of claim 1 wherein the transceiver acts as an access point for a cellular wireless device and the protocol gateway and the transceiver relay traffic between the cellular wireless device and a base station of a cellular wireless network.

24. The portable wireless gateway of claim 1 wherein the protocol gateway and the transceiver cooperate to securely send Internet protocol data via encrypted tunnels of a virtual private network.

25. A portable wireless gateway comprising:
at least one access point that communicates with user devices;
a transceiver that communicates with a network; and,
a protocol emulator comprising:
a protocol gateway that encapsulates user device data relayed by the at least one access point to prepare the user device data for transmission by the transceiver in a protocol associated with the network in communication with the transceiver, and unpackage data from the network relayed by the transceiver for delivery to the at least access point and relaying to at least one of the user devices, wherein the protocol emulator connects to a wireless operator network by presenting the wireless operator network with a gateway ID, connects to a third party service provider via the wireless operator network, authenticates the portable wireless gateway with the third party service provider by presenting the third party service provider with the gateway ID, requests an equipment identification number (EIN) from the third party service provider, receives the EIN from the third party service provider and authenticates services for a user by presenting the EIN to the wireless operator network.

26. A portable wireless gateway comprising:
at least one access point that communicates with user devices;
a transceiver that communicates with a network; and,
a protocol emulator comprising:
a protocol gateway that encapsulates user device data relayed by the at least one access point to prepare the user device data for transmission by the transceiver in a protocol associated with the network in communication with the transceiver, and unpackages data from the network relayed by the transceiver for delivery to the at least one access point and relaying to at least one of the user devices, wherein the protocol emulator adds a message to data sent to the user device from another source.

27. A portable wireless gateway comprising:
at least one access point that communicates with user devices;
a transceiver that communicates with a network; and,
a protocol emulator comprising:
a protocol gateway that encapsulates user device data relayed by the at least one access point to prepare the user device data for transmission by the transceiver in a protocol associated with the network in communication with the transceiver, and unpackage data from the network relayed by the transceiver for delivery to the at least access point and relaying to at least one of the user devices, wherein the at least one access point and the protocol gateway negotiate a user device handover to or from another portable wireless gateway device when a comparison of a first signal strength between the user device and the at least one access point and a second signal strength between the user device and an access point of the other portable wireless gateway indicates that a handover is warranted and wherein the protocol gateway negotiates the user device handover using a secondary tunnel.

28. An apparatus for aggregating bandwidth demand comprising:
a plurality of respective access points each respective access point of the plurality being operative to communicate with respective user devices using a respective communications protocol of the respective user devices;
a main radio transceiver that communicates with a wireless network;

a protocol emulator that determines a respective authorization of the respective user devices to receive, services from the apparatus, wherefore the protocol emulator contacts a third party subscriber database, via the wireless network, on behalf of the respective user devices, to verify a respective validity of a respective user name and password received from the respective user devices at least one time, and when the respective user devices are authorized, according to information received from the third party subscriber database, to receive the services of the apparatus, the protocol emulator packages data received by the plurality of respective access points from the respective user devices for transmission by the main radio transceiver to the wireless network, and unpackages data from the main radio transceiver for delivery to the respective user devices through the respective access points.

29. The apparatus for aggregating bandwidth demand of claim 28 wherein the protocol emulator is packages data from the respective user devices as digital cellular data, and unpackages digital cellular data from the radio transceiver for consumption by the respective user devices.

30. The apparatus for aggregating bandwidth demand of claim 28 wherein the protocol emulator emulates at least one digital cellular device to facilitate delivery of user device data to and from a remote digital cellular network base station.

31. The apparatus for aggregating bandwidth demand of claim 28 wherein the protocol emulator sets up tunnels for transporting data between the protocol emulator and a wireless service node of the wireless network.

32. The apparatus for aggregating bandwidth demand of claim 28 wherein the main radio transceiver comprises an access point that communicates with an access point of a wireless local area network.

33. A method for providing network connectivity for a plurality of respective user devices, the method comprising:

communicating with each of the respective user devices using respective communications protocols of each respective device;

contacting a third party subscriber database, via a wireless network, on behalf of each respective user device;

verifying a respective validity of a respective user name and password received from each respective user device at least one time based on information received from the third party subscriber database and when the respective user devices are authorized:

packaging data from each respective device to make the data appear to be cellular network data; and, transmitting the packaged data as cellular telephone data, thereby providing network connectivity.

34. The method for providing network connectivity of claim 33 further comprising:

receiving encapsulated data encapsulated as cellular telephone data;

unpackaging the received cellular telephone data; and, delivering the unpackaged data to the respective user devices as indicated by the unpackaged data.

35. The method for providing network connectivity of claim 33 further comprising:

establishing a communications tunnel to a service node and wherein the transmitting comprises transmitting the packaged data via the communications tunnel.

36. The method for providing network connectivity of claim 33 further comprising:

acting as a proxy for the respective user devices.

37. The method for providing network connectivity of claim 33 wherein transmitting the packaged data further comprises:

transmitting the packaged data over a respective plurality of cellular telephone channels as if the data were from a plurality of cellular telephone devices.

* * * * *